(12) United States Patent
Lugg

(10) Patent No.: US 12,480,459 B2
(45) Date of Patent: *Nov. 25, 2025

(54) SUPERCONDUCTING ULTRA POWER EFFICIENT RADIAL FAN AUGMENTED NANO-AERO DRIVE (SUPERFAN)

(71) Applicant: Sonic Blue Aerospace, Inc., Portland, ME (US)

(72) Inventor: Richard H. Lugg, Cape Elizabeth, ME (US)

(73) Assignee: Sonic Blue Aerospace, Inc., Portland, ME (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/963,661

(22) Filed: Oct. 11, 2022

(65) Prior Publication Data

US 2023/0272761 A1 Aug. 31, 2023

Related U.S. Application Data

(63) Continuation of application No. 16/450,469, filed on Jun. 24, 2019, now Pat. No. 11,466,643.

(60) Provisional application No. 62/688,689, filed on Jun. 22, 2018.

(51) Int. Cl.
*F02K 3/06* (2006.01)
*F02C 3/06* (2006.01)
(Continued)

(52) U.S. Cl.
CPC .................. *F02K 3/06* (2013.01); *F02C 3/06* (2013.01); *F02C 3/20* (2013.01); *H02K 7/1823* (2013.01);
(Continued)

(58) Field of Classification Search
CPC . F02K 3/06; F02K 3/072; F02K 3/077; F02C 3/06; F02C 3/20; H02K 7/1823;
(Continued)

(56) References Cited

U.S. PATENT DOCUMENTS 8,365,510 B2  2/2013  Lugg
8,446,060 B1  5/2013  Lugg
(Continued)

OTHER PUBLICATIONS

"The Implementation of Powered Gearboxes into Turbofans to Improve Engine Efficiency". AIAA 2014 Propulsion and Power Symposium, Session A8, Paper #144.
(Continued)

*Primary Examiner* — Joseph Ortega
(74) *Attorney, Agent, or Firm* — Maine Cernota & Curran

(57) ABSTRACT

A gas turbine engine which includes an outer casing; a central longitudinal hollow shaft with a forward air inlet; a three stage rotating superconducting electric bypass fan with front and rear fan blades and a diffuser blade interposed between said front and rear fan blades wherein the diffuser blade rotates in an opposite direction to the front and rear fan blades; a multiple stage superconducting axial compressor positioned aft of the three stage rotating superconducting electric bypass fan; a multiple stage superconducting electric turbine core positioned aft of the multiple stage variable speed superconducting axial compressor, whereby the electric power from the multiple stage superconducting electric turbine core powers the three stage superconducting electric bypass fan and the multiple stage superconducting axial compressor.

9 Claims, 19 Drawing Sheets

(51) Int. Cl.

| | | |
|---|---|---|
| *F02C 3/20* | (2006.01) | |
| *H02K 7/18* | (2006.01) | |
| *H02K 21/02* | (2006.01) | |
| *H02K 55/02* | (2006.01) | |

(52) U.S. Cl.
CPC ........... *H02K 21/024* (2013.01); *H02K 55/02* (2013.01); *F05D 2220/36* (2013.01)

(58) Field of Classification Search
CPC .. H02K 21/024; H02K 55/02; F05D 2220/36; F05D 2220/76; Y02T 50/60
See application file for complete search history.

(56) References Cited

U.S. PATENT DOCUMENTS

| | | | |
|---|---|---|---|
| 8,720,205 | B2 | 5/2014 | Lugg |
| 2009/0169367 | A1 | 7/2009 | Wadia |
| 2014/0060005 | A1* | 3/2014 | Lugg ..................... F02K 3/025 60/226.3 |

OTHER PUBLICATIONS

"Development in Geared Turbofan AeroEngine", IOP Science. Jan. 11, 2016. http://iopscience.iop.org/article.10.1088/1757-899X/131/1/012019/pdf.

"Flying's New Gear". The Economist. Feb. 1, 2016 http://www.economist.com/news/science-and-technology/21684775-quieter-more-economical-jet-engine-fitted-gearbox.

"Liebherr-Aerospace and Rolls Royce create power gearbox joint venture". Liebherr. Nov. 6, 2015. http//:www.liebherr.com/en/USA/latest-news/news-press-releases/detail/liebherr-aerospace-and-Rolls-Royce-create-power-gearbox-joint-venture.html.

"High Power Superconducting Electric Motors". 2007 Annual Review; NASA GRC. Dr. Philippe Masson, (UAPT PI), Jules Pienkos, PhD.

"High Specific Power HTS Electric Machines". Konstantine Kovalev, et al., pe.org.pl/articles/2017/11/27.

Z.Sheng, J. Tang, S. Cheng and Z. Hu. "Modal Analysis of Double Helical Planetary Gears with Numerical and Analytical Approach",. The American Society of Mechanical Engineers. Apr. 8, 2014.

G. Norris. "Rolls Royce Details Advance and UltraFan Test Plan". Aviation Week. Aug. 25, 2014. https//:asmedigitalcollection.asme.org/dynamicsystems/article-abstract/137/4/041012/372079/Modal-Analysis-of-Double-Helical-Planetary-Gears?redirectedFrom=fulltext.

"Rolls Royce runs worlds most powerful aerospace gear box for the first time". Rolls Royce. Aug. 1, 2016. http://www.rolls-royce.com/media/press-releases/press-releases/yr-2016/pr-24-10-2016-rr-runs-worlds-most-powerful-aerospace-gearbox-for-the-first-time.aspx.

Office Action for U.S. Appl. No. 16/450,469 dated Nov. 23, 2021, 16 Pages.

Notice of Allowance for U.S. Appl. No. 16/450,469 mail date Jun. 8, 2022, 11 pages.

* cited by examiner

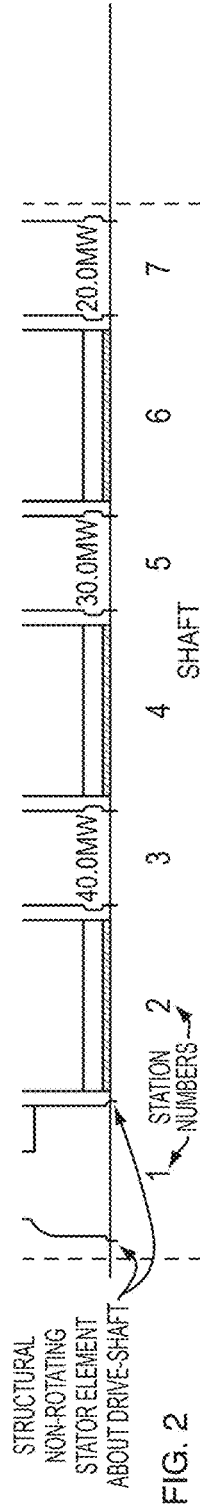

FIG. 2

BULK SUPERCONDUCTING TRAPPED FIELD TURBINE GENERATOR POWERED BLISK

Based on critical state model, the peaked trapped magnetic flux density $B_{trap}$, at the center of the top surface of a single grain bulk superconductor, oriented with its thickness parallel to the c-axis, due to an induced, persistent, super-current, is given in its simplest form $$B_{trap} = K\mu_0 J_c a; \text{ where}$$

$\mu_0$ = permeability of the free space $J_C$ = critical current density of the superconducting material $a$ = sample radius $K$ = correction factor to the simple "critical state model of magnet flux" due to finite thickness "t," of bulk disc shaped superconductor Using "Biot-Savart Law"

$$K = \frac{t}{2a} \ln\left[\frac{a}{t} + \sqrt{1 + \left[\frac{a}{t}\right]^2}\right]$$

General Formula for magnetic field of any height (z), above a superconducting desc of radius "a" and thickness "t," as presented:

$$B_{trap}(z) = \frac{\mu_0 J_c}{2}\left[(z+t)\ln\left[\frac{a+\sqrt{a^2+(z+t)^2}}{z+t}\right] - z \cdot \ln\left[\frac{a+\sqrt{a^2+(z+t)^2}}{z+t}\right]\right]$$

Bulk superconductors can trap magnetic fields of magnitude over ka times higher than maximum field produced by conventional magnets, which is limited practically to rather than less than 2T. In the invention of SuperFan, the bulk superconductor in the "rotor" of the "stator-rotor-stator Stage," off the shaft exhibit $J_cS$ of $5\times10^4$ A/cm² at 1.0 Tesla

SUPERFAN SB135 PROGRAM AND ENGINE DETAILS

A. ENGINE DEFINITION - FLIGHT
 - MISSION AND PERFORMANCE
 CUSTOMER

B. ENGINE CONCEPT AND SYSTEMS
 HYBRID ELECTRIC SYSTEMS AND
 SUBSYSTEMS: POWER EFFICIENCY
 DISTRIBUTION; POWER AND PROPULSION
 ENGINE DETAILED DESIGN-ELECTRO-
 MAGNETIC AND TURBOMACHINERY SYSTEMS
 TRL-1 - PATENT AND CONCEPT         TRL-5 - BENCH TOP MAGNET DEVICE
 TRL-2 - ENGINE LAYOUT ARCH.         TRL-6 - BLISK BUILD + TEST
 TRL-3 - PRELIM DESIGN MAJOR COMP.   TRL-7 - CORE TEST
 TRL-4 - DETAIL DESIGN                TRL-8 - COMP. BUILD TEST
                                      TRL-9 - COMBUSTORFAN BUILD + TEST

ENGINE SIMULATIONS PLATFORM
 - THERMODYNAMIC
 - MECHANICAL
 - MATERIAL
 - ELECTRIC

ENGINE HARDWARE DEMONSTRATION
 1 - TURBINE BLISK
 2 - 3-STAGE BLISK CORE
 3 - 5-STAGE COMPRESSOR
 4 - ELECTRIC COMBUSTOR
 5 - 3-STAGE ELECTRIC FAN
 6 - POWER MANAGEMENT ARCHITECTURE
 7 - ELECTRIC ENGINE CASING + ASSEMBLY

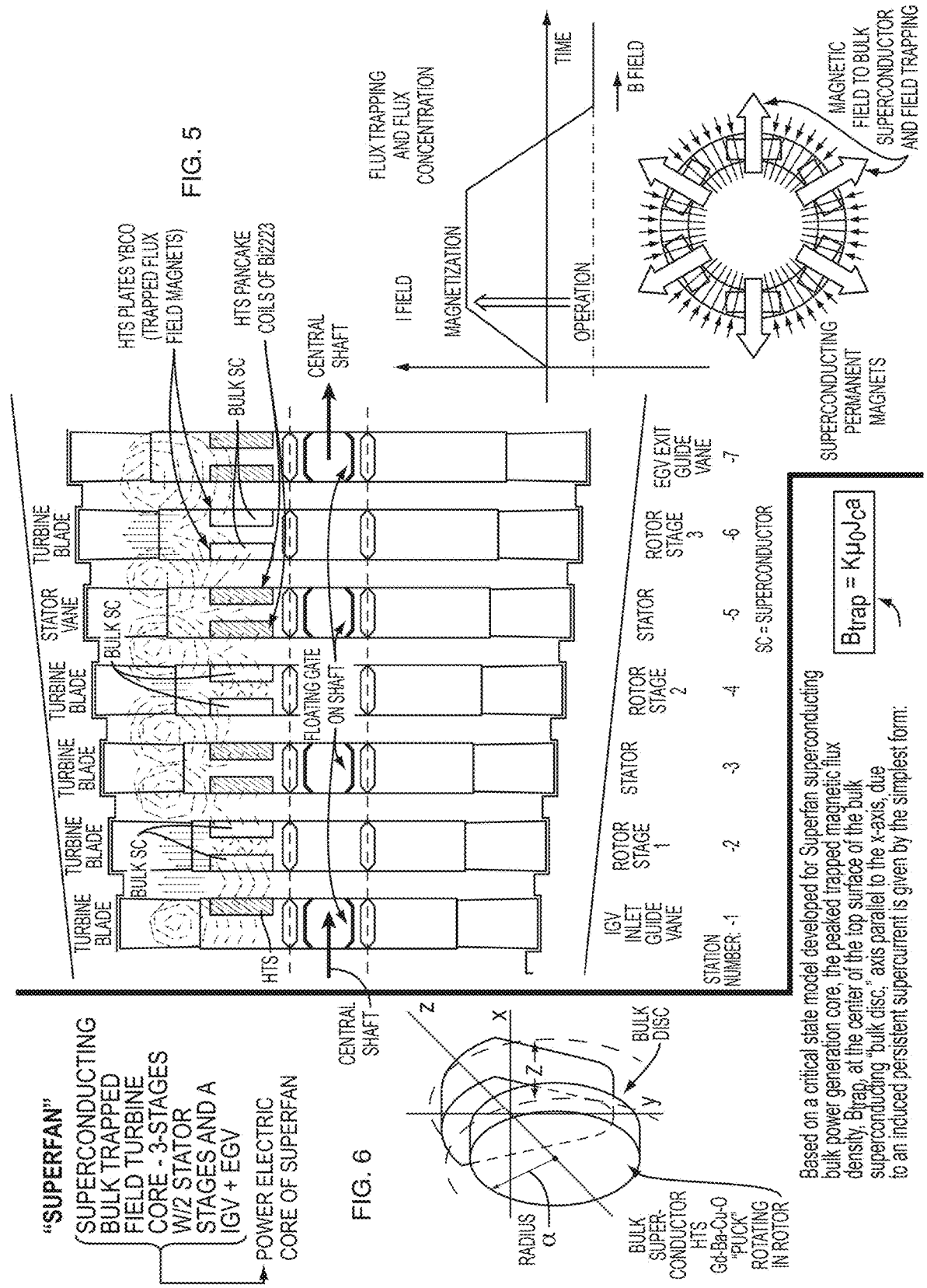

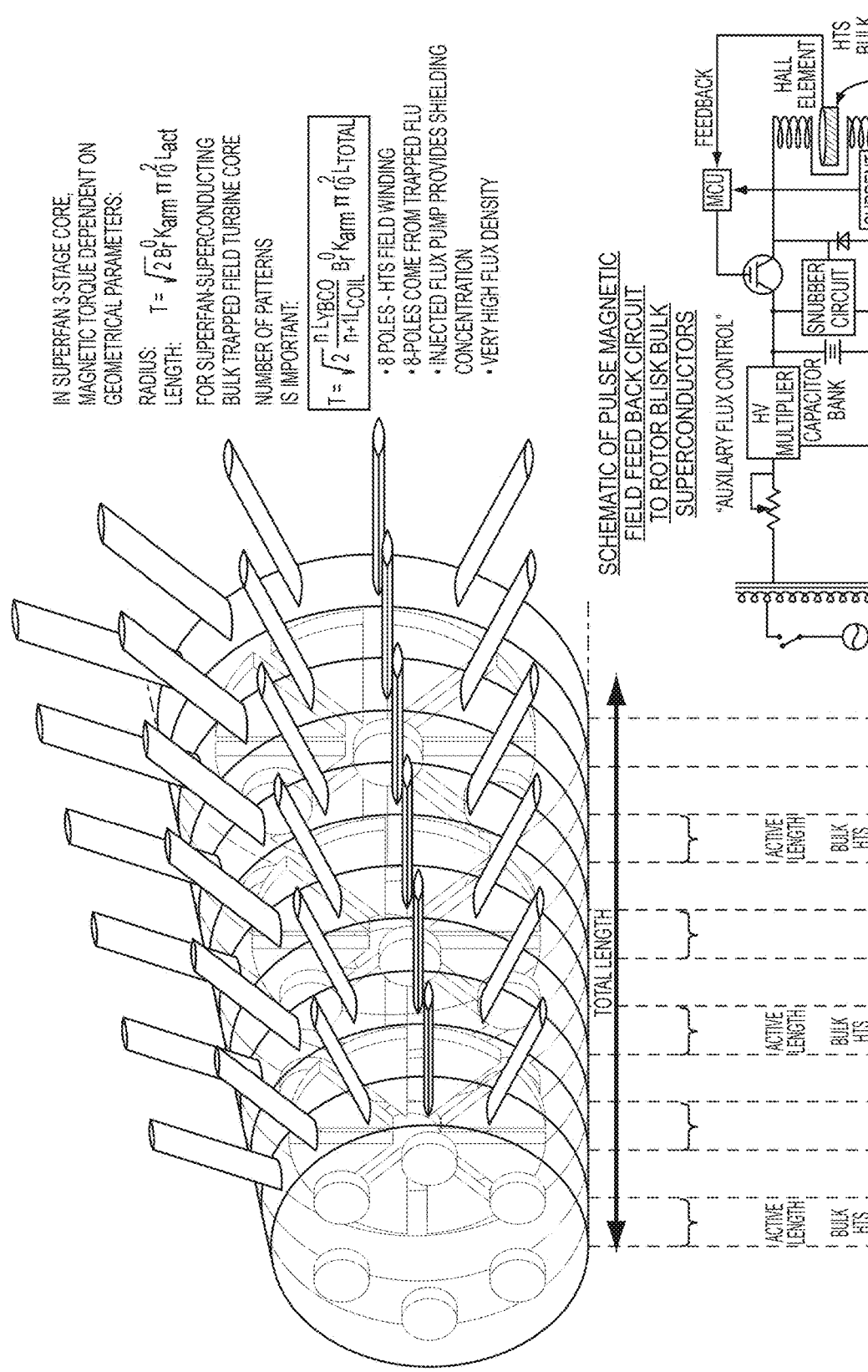
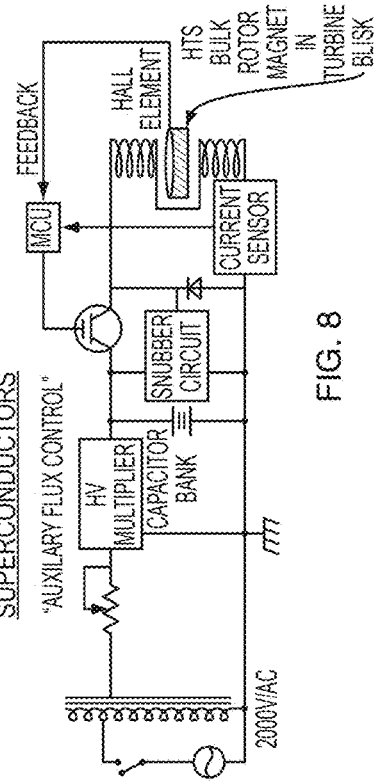
FIG. 7
FIG. 8

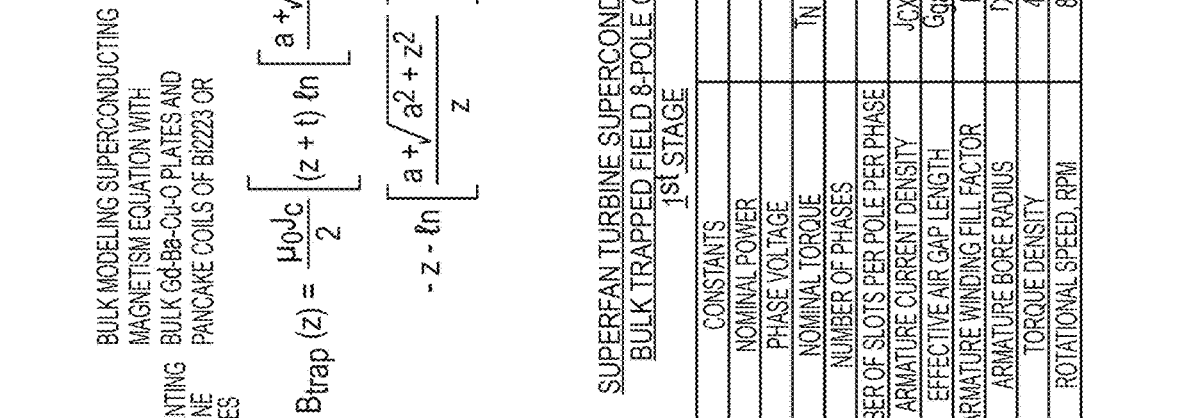

FIG. 10

ROTOR/STATOR OF SUPERFAN
UNIQUE AND NOVEL
DESIGN ARCHITECTURE

- Gd-123 BULK SUPERCONDUCTING MAGNETS
- Bi-2223 WIRE WOUND FIELD MAGNETS
- CRYOGENIC NITROGEN FOR COOLING
- FLUX PARALLEL TO THE ROTOR AXIS
- 8-POLE SYNCHRONUS MACHINE DESIGN

BULK MODELING SUPERCONDUCTING MAGNETISM EQUATION WITH BULK Gd-Ba-Cu-O PLATES AND PANCAKE COILS OF Bi2223 OR REPRESENTING TURBINE BLADES $$B_{trap}(z) = \frac{\mu_0 J_c}{2} \left[ (z+t)\ln\left[\frac{a+\sqrt{a^2+(z+t)^2}}{z+t}\right] - z \cdot \ln\left[\frac{a+\sqrt{a^2+z^2}}{z}\right] \right]$$

SUPERFAN TURBINE SUPERCONDUCTING BULK TRAPPED FIELD 8-POLE CORE
1st STAGE

| CONSTANTS | VALUE |
|---|---|
| NOMINAL POWER | 40MW |
| PHASE VOLTAGE | 5.3kV |
| NOMINAL TORQUE | TN = 17.9 MNm |
| NUMBER OF PHASES | M = 3 |
| NUMBER OF SLOTS PER POLE PER PHASE | q = 8 |
| ARMATURE CURRENT DENSITY | JcX = 20A/mm² |
| EFFECTIVE AIR GAP LENGTH | Ggap = 10mm |
| ARMATURE WINDING FILL FACTOR | Km = 0.9 |
| ARMATURE BORE RADIUS | rX = 0.59m |
| TORQUE DENSITY | 44 Nm/Kg |
| ROTATIONAL SPEED, RPM | 8000 RPM |

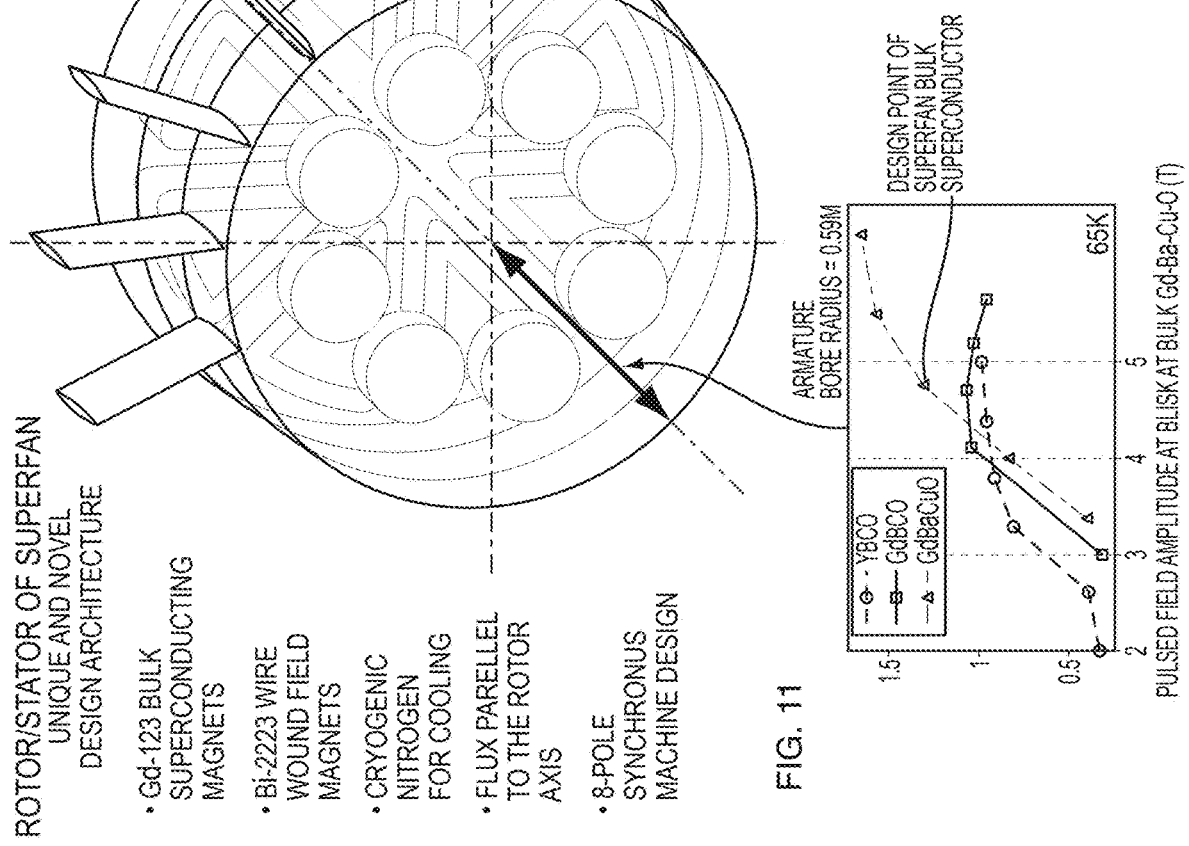

FIG. 11

STEP BY STEP PARAMETRIC PERFORMANCE ANALYSIS
OF SUPERFAN STARTING WITH 1ST STAGE COMPRESSOR

- DESIGN POINT OF SUPERFAN IS SET BY THE FORCE VECTOR UPON A SINGLE TURBINE BLADE (THE ULTIMATE DESIGN ENGINE OPERATION POINT)

- FORCE VECTOR BECOMES RPM

- RPM SETS POWER DESIGN POINT OF SUPERCONDUCTING ELECTRICAL MACHINES IN TURBINE MADE UP OF BULK SUPERCONDUCTING MAGNET BLISK ROTOR, ROTATING ABOUT A STATIONARY SUPERCONDUCTING WOUND ELECTROMAGNET IN AXIAL ALIGNMENT WITHIN EACH STAGE OF COMPRESSOR

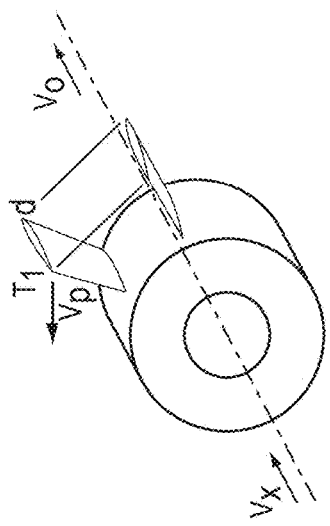

① $P_1 \psi_1 A_1 = P_2 \psi_2 A_2$

② $\dfrac{A_1}{A_2} = \dfrac{P_1}{P_2} = \sigma = \tilde{G}$

③ $\left\{ \dfrac{1 - K(1 - \tilde{G})}{K - 1} \right\} = \alpha = \tilde{G}^{\alpha}$ ④ $\tilde{G} = \dfrac{T_1}{T_2} = \sigma^{-\alpha}$ ⑤ $T_2 = \tilde{G} T_1$ ⑥ $\Delta T = T_2 - T_1$ ⑦ Enter Equations
$\tilde{G} \Delta T = \omega \Delta (r\ell)$
$= \omega r (V_{I\ell} - V_{op})$ ⑧ $\omega = \dfrac{C_p \Delta T}{r(V_{I\ell} - V_{op})}$

FIG. 23

SUPERCONDUCTING ULTRA POWER EFFICIENT RADIAL FAN AUGMENTED NANO-AERO DRIVE (SUPERFAN)

RELATED APPLICATIONS

This application claims rights under 35 U.S.C. 119 (e) from U.S. Application Ser. No. 62/688,689 filed Jun. 22, 2018, and U.S. application Ser. No. 16/450,469 filed Jun. 24, 2019, which are incorporated by reference in their entirety herein for all purposes.

FIELD OF THE INVENTION

The invention relates to aircraft engines, and more particularly to hybrid turbojet engines.

BACKGROUND OF THE INVENTION

From the aircraft propeller to air-breathing jet engines, the history of aviation is abound by examples of break-through technologies, leading to the realization of systems once considered to be unattainable. Now, more than a century after the Wright Flyer took to the air, high temperature superconducting (HTS) technology in the form of motor and generator electric machines has matured to the point of becoming one such breakthroughs of our time. Specifically, this is seen in trends in aviation propulsion applications where HTS technology where it will usher in an era of environmentally sustainable air transportation—a transition that is not only being mandated by political and regulatory bodies, but also demanded by consumers of air travel and aviation services.

SuperFan provides an innovative and ground breaking electric hybrid gas turbine engine architecture arrangement in a turbofan platform which will deliver revolutionary improvements in areas of fuel burn and kinetic energy extraction through combustion, emissions and aircraft/engine noise. The SuperFan turbofan hybrid-electric engine design is configured to fully leverage on the favorable electric and gravimetric characteristics of HTS electric machine technology, specifically high-speed electric machines, both motor and generator, fully embedded and integrated within existing turbomachinery engine architectures maximizing and optimizing thermal, aerodynamic and mechanical performance from this hybrid aero-propulsor engine design.

Global warming has become one of the more pressing issues of our planet as each day goes by. The earth is at risk as more greenhouse gases are expelled into the atmosphere from the burning of fossil fuels in many industries. The transportation industry is one of them and the aviation sector is a big contributor. By the numbers and statistically, in less than the next two centuries, some experts and scientists predict life will be largely unsustainable on earth due to shortages of food, water and energy along with the atmosphere seeing continued warming from emissions of greenhouse gases into the ozone.

Transport commercial aircraft have been major contributors to the warming of the earth's atmosphere as the gas turbine engines used to power these aircraft pollute at 35,000 feet with the most harmful greenhouse gases . . . carbon dioxide ($CO_2$), Sulfur Dioxide ($SO_2$), and Nitrogen Dioxide ($NiO_2$). Annually, passenger airliners dump tens of billions of metric tons of $CO_2$ into the atmosphere at these high altitudes making it for extremely damaging conditions on ozone depletion and greenhouse gas thermal warming.

According to the EPA, in 2015, passenger aircraft dumped 40 billion metric tons of $CO_2$ into the earth's atmosphere. The Global Carbon Project stated that this data is 2.3 percent higher in $CO_2$ emissions from aircraft than the previous year in 2014.

It is essential that global society find ways to reduce pollution, combat emissions, offset continued global warming, and discover new ways to transport itself. The International Air Transportation Association (IATA) expects 7.8 billion passengers to travel in 2036, a near doubling of the passengers that had flown by the end of 2017. The prediction is based on a 3.6% average Compound Annual Growth Rate (CAGR) noted in the release of the latest update to the association's 20-year passenger forecast. All indicators lead to growing demand for global connectivity. The world needs to prepare for a doubling of passengers in the next 20 years. As stated by the IATS's Director General and CEO, Alexandre de Juniac, "this is fantastic news about innovation and prosperity, but also a great challenge for governments and industry, and we must ensure that industry can meet this great challenge for growth".

Such a large increase will result in 4-5 million more passengers that have to be moved each year. With carbon emissions already a pressing issue, an increase in the number of aircraft could have devastating effects in the future. Aircraft spew the harmful greenhouse gases directly into the upper atmosphere, hence the seriousness of this form of pollution. The warming atmosphere is the key issue in today's pollution because it is becoming filled more and more each day with greenhouse gases, and as mentioned earlier, they are $CO_2$, $SO_2$ and $NiO_2$. Our ability to radically reduce these greenhouse gases is dependent upon our ability in technological advancement and innovation to create new methods, for example in transportation, and subsequent "green" products, to cut these emissions. The capacity for us to cut these emissions as much of, and as fast as is possible, will have a dramatic impact on what will happen to our planet in the next few decades to come.

SUMMARY OF THE INVENTION

Hybrid-Electric Propulsion Technology for a Sustainable World

SuperFan offers a promising solution toward reducing significantly the 40+ billion metric tons of $CO_2$ being dumped each year into the earth's atmosphere. It will be the world's first truly hybrid-electric aero gas turbine operating with fully integrated superconducting power generation and motor propulsion architectures. It provides a fully-electric, 3-stage (twin bypass, counter-rotating fans, with interstage counter-rotating diffuser) variable-speed bypass fan. This alone will provide the greatest jump in efficiency as the main propulsor of the engine (the bypass fan) addresses critical gains in engine propulsion efficiency across five factors, or metrics of performance; 1) aerodynamic, 2) thermal, 3) mechanical, 4) acoustical and 5) materials. The SuperFan fan blades are shrouded in a cylindrical duct or nacelle which houses magnetically levitated fan stages, and HTS drive motors at the hub axially aligned with the hollow shaft core, with each of the two fans and interstage counter rotating diffuser.

Electric power is derived and generated from a 3-stage counter-rotating high temperature superconducting (HTS) turbine core from behind the combustor. The SuperFan turbine core utilizes a fully superconducting electric generator architecture where both HTS wound field electromagnets in the stators, through induced flux field charged power, induce a magnetic field into a rotor, where trapped bulk field HTS magnets embedded in a 6-pole array are rotated at high-speed by the induced exhaust flow upon the turbine blades from the associated combustor upstream of the turbine core (FIG. 1). The architecture of the core, as it is fully superconducting, is that each HTS bulk field magnet rotor stage with turbine blades at the perimeter has two associated wound HTS field magnet stator stages. Electric power is at a very high field strength or Tesla, and is induced from the spinning rotor (driven by the exhaust flow upon its blades) into the two representing field magnet stator stages. The stator stages are fixed and attach to the outer engine casing of the SuperFan turbine core. With this structural attachment there is a method of the induced electric current from the rotating HTS bulk field magnet rotors coming into the HTS field magnet power generation stators, where it may be moved and powered down the length of the exoskeleton outer engine casing with embedded and shielded HTS cables. The electric power is transmitted to power the HTS 13-stage axial motor compressor through SUPERFAN hollow core and engine casing, and the previously mentioned 3-stage HTS counter rotating fan and interstage diffuser at the very front of the SuperFan engine which takes in the initial inlet mass flow air for managed propulsion.

SuperFan has the potential of becoming key to commercial air transportation with dramatic new levels of efficiency improvement in engine performance (approximately a ten year $480 billion revenue engine market—subsonic turbofans), and provide almost near zero emissions operation as it also will have the electric power generation within the engine to power proprietary "ion plasma fuel combustion", almost eliminating greenhouse gas emissions from the engine.

Turbofan engines which fly major commercial transport aircraft release a range of dangerous chemicals into the air, from un-burnt fuel to the big three greenhouse gases; carbon dioxide, nitrogen dioxide and sulfur dioxide. Carbon dioxide is the largest contributor to the rising temperature of the planet because it traps heat from the sun. Nitrogen Oxides are harmful in a different way. When there is sufficient moisture, nitrogen oxides will dissolve into rain and form acid rain. Acid rain destroys crops by disrupting the pH balance in soil. Moreover, acid rain slowly eats away at calcium carbonate, a main ingredient used in concrete. The result is weakened concrete structures in bridges and skyscrapers.

The SuperFan turbofan engine is designed to reduce NOx emissions and micro-particulate pollution. By means of the following features, SuperFan is designed to reduce fuel consumption by as much as 65%, through the use of a radical departure in the fan design where 3-stages is driven electrically, disrupt the physics of efficiency in the production of bypass air, or core thrust in the engine. 1. A three stage bypass fan which pushes air and diffuses air simultaneously. The second stage is not a fan it actually a counter-rotating diffuser. 2. With the rotation of the first fan, counter to the second fan, or diffuser of the bypass fan assembly, this design increases the volume of air (an increase in mass flow) and slows the speed of the air 3. This allows the fan in its first two stages to push more air, on less fuel, in a given period of time between the 1st stage fan and the 2nd stage diffuser 4. At the 3rd stage of the fan assembly the expanded volume of air, at increased velocity is pushed again at the 3rd stage fan assembly and exited. 5. No gear box assures the fan blade acoustical signature is entirely different and at lower frequency and quieter as the fan does not sit on a shaft. 6. The 3 fan stages are magnetically levitated, no metal to metal friction, nor high frequency acoustics exit. 7. In each fan stage of the 3-stage assembly, the blade tips are captured by a magnetically levitated outer ring (they are captured by the superconducting electric motor ring toward the center hollow core of the engine as well).8. The 3-stage fan assembly is designed to remove loud high frequency noise emissions as the blades have a different acoustic vibration and lower frequency. 9. The 3-stages are dimensionally further away from the detrimental supersonic speeds which is a design limiting parameter operating at a rotational lower Mach number. 10. The 3-stages of the fans of SuperFan have a much larger bypass fan ratio at smaller diameter because of the electric 3-counter rotating stages as compared to known geared turbofans by Pratt & Whitney, and UltraFan by Rolls Royce proposed to replace the Trent engines by 2025.

Noise regulations at airports continue to become more stringent with limitations on both take-off and landing speeds to keep engine noise down, and also on cabin noise. Noise in today's aircraft cabins remain around 78 dB when cruising, with most of the engine noise attributed to it producing high air speeds and causing turbulence when meeting with outside slower air. This has to do with the bypass air velocity, the efficiency of the mixer, and the velocity of the air as it exits the bypass fan as compared to the velocity when it enters the bypass fan at cruise.

The Pratt & Whitney (P&W) geared turbofan technology allows for the bypass fan to operate at slower RPMs (revolutions per minute), pushing more air with a larger diameter fan. This reduces the noise of the differentiating air velocities, those entering and those existing. Unlike P&W geared turbofan technology, where it is more efficient as it is operating at a slower speed, that speed is still fixed by the gear as it is fixed to the constant rpm spool coming off the low-pressure turbine. In SuperFan, the three fans are all variable speed as they operate electrically, and each rotational speed, one fan to the next, is optimized to maximize compressing the volume of air, expanding it, pushing it. This is the main difference with the SuperFan hybrid turbofan compared to what is known in the art today.

The second stage slows the mass volume of air a second time, but now with greater expansion ratio (larger volume being compressed and pushed than in a geared turbofan architecture, that has only one bypass fan). The counter rotating diffuser, expands the flow, reduces aerodynamic swirl and noise, and compresses and push air a second time into the third fan stage (counter-rotating to the second stage diffuser). This occurs in the SuperFan architecture, at an ideal rpm, for each stage governed electrically by velocity of air, mass volume and air density.

This reduces the noise of compressing and expanding the air (design estimates are from 125 db down to 85 db) as its velocity is increased, at the first stage fan, slowed and noise absorbed at the second stage counter rotating diffuser, and expanded, then re-compressed and pushed through the third stage of SuperFan. From the fan inlet to the fan exhaust, and the inlet guide vane at the compressor entrance, the noise signature improves (is reduced) and better managed by the varying speed SuperFan for thrust and compression aerodynamics, matched to and managed by the flight dynamics and mission of the aircraft at any point in its flight path. This results in higher propulsive efficiency with less work energy.

The accomplishment of optimized variable-speed mass flow dynamics of bypass air by the SuperFan design is the first of its kind. It not only reduces noise, it reduces the energy required to push the air by the fan due to the higher torque seen in superconducting motors and higher power densities, than observed in mechanical drive systems. Magnetic torque densities designed into SuperFan are calculated and observed at the outer perimeter of the hollow core shaft, as at the electric fan motor hubs this measures roughly 22 inches across and the magnetic shear gap is measured in Newton-meters, and exceeds considerably more so than the mechanical drive systems observed in mechanical spool systems as in the Rolls Royce Trent 1000, and the GE GenX, and previous GE90 turbofan family of engines. This performance metric tied to engineering design of the fan exceeds the mechanical drive systems it competes against due to the longer axial length at the hollow shaftless core versus the axial length of mechanical systems, where improved metrics of performance include fan diameter. The ratio of fan diameter to axial length is a baseline to performance and met to magnetic torques densities at the hollow shaftless core (the core carries the copper electromagnetic stator or a wound superconducting electromagnet in the fan hub with the superconducting rotor defining a synchronous superconducting AC motor). SuperFan is designed to maximize the "electric performance target" of Newton-meter forces at the magnetic shear gap, at a Tesla number that is higher than anything conceived before in electric superconducting high-speed machines above 1000 RPM), but not so unmanageable that saturation of the superconducting magnets occur.

For a given revolutionary speed (RPM), and SuperFan being electric, each fan stage is variable speed and hence the operating RPM for any flight condition is optimized to maximizing mass flow across each fan stage. This occurs at the highest mass flow volume, lowest torque (lowest energy power consumption), lowest speed, thus maximizing bypass air volume and propulsive efficiency. In terms of physics, magnetic torque densities will have higher performance numbers than mechanical systems, meaning less work, or energy is required to spin a given fan stage at so many revolutions per minute to meet the required mass flow velocity, at a given altitude, density, temperature, to push the aircraft through the air at the required Mach number. As more work is done on the air with less energy, this improves thrust specific fuel consumption, reducing it dramatically. There are no mechanical bearings or lubricants required in the SuperFan hybrid gas turbine to support the rotating fan, compressor and turbine stages. All the turbomachinery stages in SuperFan are magnetically levitated, held between the inner rotor fan hub ring and the outer fan channel ring, there is no mechanical drag or friction, and turbulent aerodynamic eddy currants are removed.

The job of the bypass fan is to produce the majority of the thrust for the aircraft. For subsonic flight where airliners cruise between Mach 0.85 Mach and 0.95 Mach, the fan produces between 75-85 percent of the thrust dependent on size for the aircraft, thrust class and other design parameters of the engine. In geared turbofan technology and engine design, once air has exited the fan, it passes through a stationary set of blades (outlet guide vanes) to straighten the airflow as it exits the mixer, as it is not fully laminar as it exits the fan. With SuperFan having a 3-stage counter-rotating fan this not only dramatically improves thrust efficiency, but it also removes any turbulence from the flow as the thrust is created. Thus, in SuperFan there is no stator stage aft of the SuperFan, as it is not required.

Optimization of thermal power in a gas turbine engine starts with the thermal power and its optimization in the thermodynamic cycle scheme, i.e. the thermodynamic relations of cycle media in the process of power production. This is in turn begun with an understanding of the flight mission of the gas turbine designed for aero-propulsion and the thrust class and required flight Mach number required at cruise condition and at given altitude. In accordance with Carnot's rule of thermodynamics it involves the introduction of fuel heat input at maximum possible temperature, compression and expansion, at maximum compressor and turbine efficiency, along with release of non-convertible heat to ambient temperature at minimum loss. This is typically examined and understood in thermal and engine cycle analysis and use of the Brayton Cycle which defines the thermal cycle and its performance in each of the four quadrants; inlet-compression, pressure heat addition, combustion, and expansion of the Brayton Thermodynamic Cycle.

Gas turbine engines and aircraft powered by gas turbine engines, are limited in overall design and performance by mechanical, material and thermodynamic laws. They are further constricted by the design limitations of the four elements of turbomachinery which make up the baseline design of gas turbine engines; the bypass fan, compressor, combustor and turbine. These four design elements are further constricted by the core design limiting spools or shafts at the inner center of the turbine, to which there rotating blades are attached via blisks (bladed discs) and are attached to; push and compress air, raise gas temperature, fuel added, combustion achieved, driving the turbine and achieving thrust. In gas turbines, these four turbomachinery elements are contained inside of the outer turbine casing and are centered on a load bearing drive shaft(s), that connect the turbine (on the rearward portion of the drive shaft) with the bypass fan and compressor (on the forward portion of the drive shaft).

In the SuperFan gas turbine engine there is no load bearing drive shaft at the center of the engine. The SuperFan is shaftless and at the center is a hollow core which carries megawatts of electricity forward and aft to rotate the turbomachinery electrically with superconducting electric motors and generators. The engine has proprietary superconducting generation architecture in the turbine core hot section where the turbine blisks rotated and driven by the hot exhaust gases from combustion in the combustor rotate the turbine blisks by the high velocity gases impinging on the turbine blades.

The SuperFan gas turbine engine has no drive shaft and operates electrically as it brings the future of hybrid electric propulsive power to the aerospace industry and specifically the aviation airline industry. This aviation market sector shows the fastest and steadiest growth compared to other aerospace sectors and offers the highest engine production and revenue rates globally in the world engine industry. The electrification of the gas turbine and the opportunity to design and create a true hybrid revolutionizes the operation and efficiency of the gas turbines by removing the drive shafts in the SuperFan design, lifting the key design constraints of un-optimized operation conditions where typically the drive shafts run at constant speeds and do not accommodate the necessary optimized and varying design speeds to changes in atmospheric temperature, air density, mass air flow rate and thrust requirements during flight, varied design speeds matched to flight speeds of the rotating turbomachinery of the air flowing through the engine and around the engine. The ability of SuperFan to now drive electrically and independently from one another, all bypass fan, compressor and turbine stages electrically, and thus optimize all turbine operations to match exactly all the thermodynamic, mechanical and atmospheric flight conditions, driving performance and efficiency improvements dramatically, as seen in the lowest fuel burn rates and the highest thrust to weight ratios, with lowest size engine volumes is the new era of aerospace propulsion to be achieved.

Gas turbine engines are thermal machines. They operate within certain defined laws of thermodynamics and physics with mechanical limitations of the materials that are used to build them. Gas turbine engines are used predominantly to fly commercial jet engines in a turbofan engine configuration (a large fan pushes the majority of the air) to provide the propulsive force to fly the aircraft. Typically the drive shafts in gas turbine engines are double spool or triple spool designs. For turbofan engines for commercial airliners, three drive shaft spools are seen, and are common, at the center core of the engine running from the front to the back. These attach, one of each of the three turbine disks in the core, being driven and rotated by the combusting hot gases, to drive the low pressure compressor, the high pressure compressor and the bypass fan. The compressors job is to compress air, raise its density and temperature to a specific level, so that combustion will occur with the very hot and compressed air as it enters combustion and ignition is provided, as fuel is added. The bypass fan is a large diameter single fan the job of which is to push the majority of incoming air around the core of the engine, the compressor, combustor and the power turbine.

In a gas turbine turbofan design, the bypass fan is the major propulsor of the engine system to provide enough thrust to power the aircraft through the air at its set optimal design cruise flight speed (typically about 0.91 Mach). In most bypass fan engine designs, the fan is placed geometrically, and in such a concentric station position (axial location along the center line of the engine) in the overall engine architecture whereby it pushes 15%-20% of the air through the center of the engine. Through the center means through the rotating stages of the core compressor, for the air to be heated and compressed for combustion. The larger majority balance of air, or the mass flow, is pushed by the bypass fan around the compressor, combustor and the power generation turbine core and out the back as unheated air in an outer circumferential flow path for the majority of the thrust. Thus there is a core hot combusted flow path of thrust produced by the turbine and that travels at high velocity, and a cool bypass air which comes from being pushed by the fan, these join in a mixed flow of exhaust high temperature and low temperature and mix in a "mixer" nozzle structure aft of the combustor.

Superfan Benefits:
1. Hybrid-Electric is Better:
   Hybrid-Electric is at very near zero emissions, SuperFan uses the SonicBlue ion plasma combustor technology where plasma injectors burn all oxides and $CO_2$ prior to exhaust effluent.
   Hybrid-Electric is shaftless, allows for counter-rotating diffuser interstage, variable speed bypass fan with unlimited power source from superconducting turbine core.
   Variable speed(s) electric SuperFan provides highly efficient compression of pushed air, at higher mass flow ratios and at higher velocities at lower a work load.
   Electric provides counter-rotating diffuser which dramatically increases air volume of fan, air is pushed as it is expanded before it is pushed again by the second fan located at the 3rd stage position.
   Three-Stage SuperFan architecture provides lower, and less stressful load bearing on blade, more efficient, lower structural vibration.
   The single stage fan blade loading is lowered due to the mass flow loading dropping as mass air flow loads are spread between three electrically driven fan stages, giving high aerodynamic efficiency.
   A reduced noise signature at a lower frequency is evident, as vibration modulation due to the higher bypass ratio and much larger diameter fan provide thrust from a greater volume of air.
   Superfan brings into unity fan pressure ratio in conjunction with total pressure ratio across three major turbine components; fan, compressor and turbine.
   Lower fan stage loading means lower fan acoustics vibration, means lower fan noise at higher efficiency.
   Electric bypass fan offers an independence from mass air flow loading and aerodynamic work done by the electric compressor, SuperFan disrupts the geared turbo fan limited by fixed spool speeds.
   The bypass fan operates at ideal speeds, varying as flight speed requires, and is not constrained by the compressor or the turbine, and vice versa, as these are electric too, less complexity, less cost, half the number of turbine components, less complexity, never any off-design condition, SuperFan runs at 100% efficiency one hundred percent of the time for any flight condition or demand.

The propulsive efficiency of a gas turbine engine can be improved by extracting a portion of the energy from the engine's gas generator (turbine core), to drive a fan. The ducted fan pushed a portion of the overall air through the turbine, but by-passes the turbine, exhausting to the rear at ambient air conditions. The turbofan as it is called increases the propellant mass flow rate with an accompanying reduction in the required propellant exit velocity for a given thrust. Since the rate of production of "wasted" kinetic energy in the exit propellant gases varies as the first power with mass flow rate, and as the square of the exit velocity, the net effect of increasing mass flow rate and the decreasing exit velocity, is to reduce the wasted kinetic energy production and to improve propulsive efficiency. The introduction of the bypass fan in the engine architecture offers greater efficiency through modernization of typically high endothermic and entropic thermal reactions of pure turbojets by optimizing mass flow rates and exhaust velocities (Note: The Turbofan was first invented in about 1972, first flew in 1975, and was an outgrowth of supersonic fighter jet engines called turbojets).

The use of turbofan stage(s) enables the gas turbine to be refined to the cruise flight condition, and the low speed flight condition, and the low speed flight conditions by utilizing more of the combustion gases efficiently and by reducing the wasted kinetic energy. In SuperFan improvements can be observed in a 3-Stage (triple) superconducting electric bypass fan, with counter rotating diffuser, which is shaftless (electric powered at the hollow core center) and not constrained by the available rotating fixed speeds of a multi-shaft turbine core design as it is variable in speed. It is driven by the multi-megawatt superconducting generation power shaft core (it replaces the steel multi-spool, or drive shaft, of current engine designs, and enables the 3 multi-bypass fan stages to be optimized in operation and maximize typically constrained design variables as follows:
   1. Optimized design turbomachinery which is focused on "ideal" mass flow through the engine core and the fan. Current turbofan designs have the temperature drop through the turbine, being greater than the temperature rise through the compressor, since the turbine drives the fan in addition to the compressor. This reduces thermal efficiency.

2. Due to the disassociation between the fan and compressor, in SuperFan due to lack of a drive shaft and being electrically driven, the thermodynamic and mechanical losses are removed, and instead are additive and optimized. In operation they may be varied for the design flight condition easily.

3. This speaks to the fact that shafted gas turbines, or ones which have rotating mechanical drive spools, have that key design flaw, the "drive shaft" which limits gas turbine optimized design. Thus what is best for thermal and mechanical efficiency is the introduction of a hybrid-electric shaftless architecture as in SuperFan.

4. Further thermal and aerodynamic disassociation in current turbofan technology of today presents the active fluid dynamics of the engine in operation and associated static pressures of the fan and compressor which are differentiated (they are not matching, they are different). Due to the differentiated static pressures, inefficiency presides in a non-optimal thermal condition in gas turbine designs of today.

5. The mixer, aft of the combustor, where bypass air (ambient air) and core stream air (hot exhausted thrust from the turbine core) mixes, Mach numbers of the two entering air streams are not equal, with the mixer, its operative purpose is to thermally match the streams, and accordingly in the process of the flow, match the streams together to a design point Mach number. In turbomachinery design today there exists a thermal, mass flow and velocity mis-match. It creates a constant off-design-condition, created by the limiting operation of a mechanical drive shaft.

6. In SuperFan, by means of an electric bypass fan with counter-rotating diffuser and an electric axial compressor, the Mach numbers of the two respective streams can be matched, due to variable speed capability (variable RPM), lower thermal stagnation point and thus reducing boundary layer drag at the mixer wall, unsteady enthalpic mixing currents mid-stream are removed. Thus the two pressures of the entering streams are now made equal. Converse to mechanically driven designs, total pressure ratio of the mixer can be brought to unity and flow matching is created electrically, thus creating an ideal low-bypass fan engine with fan and compressor driven electrically.

Power balance between the fan and compressor is also critical in turbomachinery design and is developed through the relationship between the total temperature across these components. In present spool driven turbofan designs of today, like in the mixer, the power balance is more in disassociation than in unity. The utilization of a hybrid electric variable speed bypass fan is that the electric, multi-hub, counter rotating 3-stage fan of SuperFan are driven independently one to the other (not connected to a single speed shaft), thus the fan pressure ratio can be varied and optimized against temperature across these main components, fan, compressor and turbine. A multi-stage electric bypass fan has the advantage, that because each fan disc is driven independently and is variable speed as compared to the next, the fan pressure ratio (hence the mass flow) and the bypass ratio can be varied and optimized against the temperature across the engine components; the bypass fan itself, compressor and turbine. An integral expression of an "electric variable ratio bypass fan" with "bypass flow" in a mixed flow turbofan, as it relates to pressure and temperature, is described as turbine temperature moves toward Delta time, an optimal compressor-fan ratio of 1.0, for a single stage bypass fan, as defined, is divided by fan temperature to give compressor-turbine temperature ratio, which is directly affected and in ratio to fan and compressor ratio proceeding toward 1.0 as optimal, and therefore due to the independence of the 3-stage electric bypass fan in SuperFan, it can more directly influence on a percentage basis the optimal compressor-fan ratio, which is very sensitive to the compressor-turbine ratio and overall mass flow and expansion temperature ratios across the combustor and into the combustor. Thus optimization and design point ratios, compressor to fan, and compressor to turbine may be lowered, thermal and electrical efficiency is gained (lower electromagnetic drag with higher torque applied at the shaftless core, stator to rotor) and the power balance of compressor and fan, with total temperature removed, from the total endothermic/enthalpic power balance of the turbine, leaving the bypass thermic reaction more closely governed due to the electrical hybrid management of the thermal (endothermic and enthalpic reactions) and mass flow and design point ranges of operation in ratio operations, compressor to fan and compressor to turbine.

Optimized Power Balance of Thermal Electric Fan Propulsor Machine

The industrial trend toward higher electrical load requirements in modern aircraft continues to open up new possibilities in modern aircraft and for the application of superconducting electrical machine technology to today's air vehicles, both manned and unmanned. Superconducting motors and generators, in aero-propulsion applications have reported to achieve power densities in excess of 25 Kw/Kg, when coupled to gas turbines capable of operating at high rotational speeds. If used as propulsion motors in an aircraft, research shows that torque density levels of 20 to 30 Nm/Kg are attainable in superconducting machines.

The SuperFan invention is described as a fully integrated gas turbine electric turbofan machine, where superconducting generation and motor architectures are not a separate augmented system. Instead they are fully integrated in a novel and innovative systems architecture within the engine creating a true hybrid, a gas and electric architecture. Here, the HTS electrical architecture is fully integrated seamlessly into the turbofan engine layout and component architecture. No one engine propulsion, or electric system (motor, generator or power management system) is separate from another. Beyond the obvious gravimetric ramifications, another key motivation for pursuing hybrid-electric drive aero-propulsion is observed in a "clear de-coupling of power generation" from "propulsion" in a fully integrated engine architecture. This is largely the greatest innovation of Super-Fan, and where it stands out in uniqueness and not seen in exiting known in the art of hybrid electric architectures of turbofans of today or planned for the future. While maintaining the core shafted (triple spool) architecture with integrated superconducting power generation blisks Super-Fan accomplishes a real world "stepping stone retrofit" to turbofan engines of today with the segmented "electrical gearbox" of the 3-Stage SuperFan configuration. De-coupling from power generation with the propulsion becoming electric and independent in SuperFan is an important design attribute because the inherent coupling between propulsor operation mechanics and core thermodynamic cycles of conventional turbofan engine architectures results in practical and performance limitations of bypass ratio (BPR).

A larger bypass fan ratio and growth is the most distinct performance advantage of SuperFan with the unique counter rotating, 3-Stage, electric drive architecture. With a counter-rotating diffuser insert between twin bypass fans, it provides dramatic gains in propulsive efficiency by expanding and re-compressing the mass air flow at the same time as the velocity of the mass air is more closely managed in that the velocity is more constant with changes in atmospheric conditions, and mixing aft of the combustor is better managed thermodynamically. SuperFan is designed to offer unprecedented levels of design freedom at the systems level, and requires electrical linkages (i.e. cables) to operate. SuperFan thus offers a greater design freedom at the systems integration level. With electrical linkages the location of the SuperFan engine with its all-electric bypass fans creates greater flexibility in terms of the engine location on the airframe. The placement of the electrical power transmissions to and from the engine for overboard power delivered by SuperFan may imply that in the unfortunate event where there is powerless and engine failure it may not lead to asymmetrical thrust that can cause further adverse effects while the aircraft remains airborne. The type of hybrid architecture that SuperFan represents is intrinsically compatible with the emerging and continuing paradigm of the more electric aircraft, i.e. the replacement of the traditionally pneumatically and hydraulically driven functions with electrically powered components.

Historically aircraft have been designed using a great deal of regression analysis, and data from past designs. While this method is time and resource efficient, it does not cater to innovative, and revolutionary aerospace technologies that impact age-old design methodologies where they bring sudden changes in technology, particularly in propulsion. Specifically, propulsion technologies have been critical in the development of new aircraft, with leaps in system performance following sudden developments in propulsion technologies. Each part of aircraft design as it relates to the impact of new propulsion technologies is represented by a high fidelity physics-based model outputting weight, volume and performance. Such a model is developed in the method of the SuperFan design and simulation and estimation of performance focusing on the array of superconducting motors and generators which power the engine and make the electrical staging possible and the delivery of the huge multi-megawatt power to the triple bypass fan.

BRIEF DESCRIPTION OF THE DRAWINGS

FIG. 2 is a table showing program and engine details;

FIG. 5 is a vertical cross sectional view of the HTS plates and the HTS pancake coils;

FIG. 6 is a view of the power electric core;

FIG. 7 is a view of the three stage core showing magnetic torque being dependent on geometrical parameters;

FIG. 8 is a schematic diagram showing a pulsed magnetic field feedback circuit to the rotor blisk bulk superconductors;

FIG. 10 is a view of the turbine superconducting bulk trapped field 8-pole core;

FIG. 11 is a graph showing pulsed field amplitude at blisk at Gd—Ba—Cu—O;

FIG. 23 shows step by step parametric performance analysis starting with the first stage compressor.

DETAILED DESCRIPTION

Figure 1:
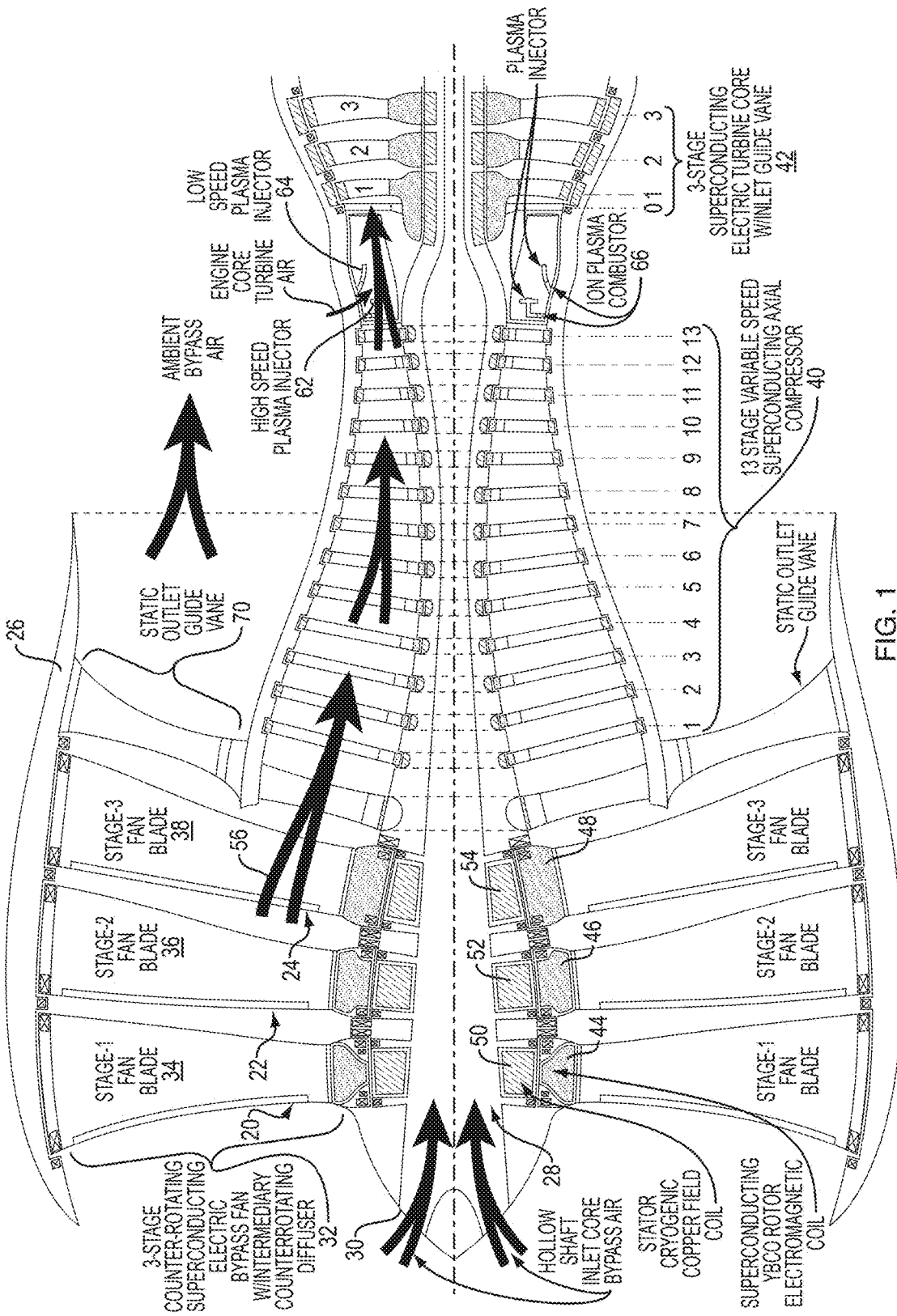
FIG. 1 is a vertical cross section of a preferred embodiment of the hybrid gas turbine engine of the invention.

Superfan Power Generation Turbine Core:

Referring to FIG. 1, the SuperFan power generation core is a 3-stage turbine with associated power extracting counter rotating blisks 20, 22, and 24 removing kinetic energy from the exhaust flow, and with embedded superconducting power generation technology embedded in each blisk houses the capacity to induce current into inter-stage stationary fixed stators, affixed to the outer casing. Electric power flows from the rotating blisks into the fixed stators where it flows inboard to the engine hollow core, and outboard to the engine casing through superconducting stator channels and is then distributed through superconducting cables (60) in the hollow-core forward to the electric compressor and associated triple-stage, all-electric bypass fans. The embedded superconductors in the rotating blisks are of a design that is greatly unique and innovative as of what is known in the art. A superconducting machine design is strongly dependent on the desired method of cooling. With significant cooling available as through the use of a cryogen in liquid form (Hydrogen or Nitrogen) it allows both the rotor and the stator to be superconducting, meaning in the turbine core the rotating turbine blisks are superconducting and the stationary stators may also be superconducting. In the SuperFan 3-stage turbine blisks core design, the core uses what is termed an "axial trapped magnetic flux design" with the rotating blisks rotating and suspended above, with magnetic levitation permanent magnets, the hollow core shaft, guided in electromagnetic channels, and with the associated stators hung from the ceiling of, what you will call, the outer the engine casing. It will be understood that the gas turbine engine includes an outer casing 26. There is also a central longitudinal hollow shaft 28 with a forward air inlet 30 and a three stage rotating superconducting electric bypass fan 32 with a front fan blade 34 and rear fan blade 36. A diffuser blade 38 is interposed between the front and rear fan blades, and the diffuser blade which rotates in an opposite direction to the front and rear fan blades. A multiple stage superconducting axial compressor 40 is positioned aft of the three stage rotating superconducting electric bypass fan. A multiple stage superconducting electric turbine core 42 is positioned aft of the multiple stage variable speed superconducting axial compressor. The front fan blade, the diffuser fan blade, and the rear fan blade are incorporated respectively into the first blisk, the second blisk, and the third blisk, with each being positioned radially outwardly from the longitudinal hollow shaft. These blisks respectively have first, second, and third integral superconducting rotor electromagnetic coils 44, 46, and 48. First, second, and third stator coils 50, 52, and 54 are fixed to the inner hollow core and outer casing in proximate opposed relation respectively to the first, second, and third integral superconducting rotor electromagnetic coils. A mass flow of accelerated air is generated by the 3-stage bypass fan 56 is established which rotates the superconducting electric bypass fan to remove kinetic energy from the exhaust flow to induce an electrical current in the fixed first, second, and third stator coils. The stator coils are cryogenic copper field coils. There are superconducting stator channels 58 between the stator coils and the outer casing and superconducting cables 60 in the outer casing. Electrical power flows from the stator coils to the multiple stage superconducting axial compressor. The multiple stage superconducting axial compressor is a variable speed multiple stage superconducting axial compressor. A high speed plasma injector 62 and a low speed plasma injector 64 connect the multiple stage axial compressor with an ion plasma combustor 66. There is also an inlet guide vane 68 and a static inlet guide vane 70.

Figure 3:
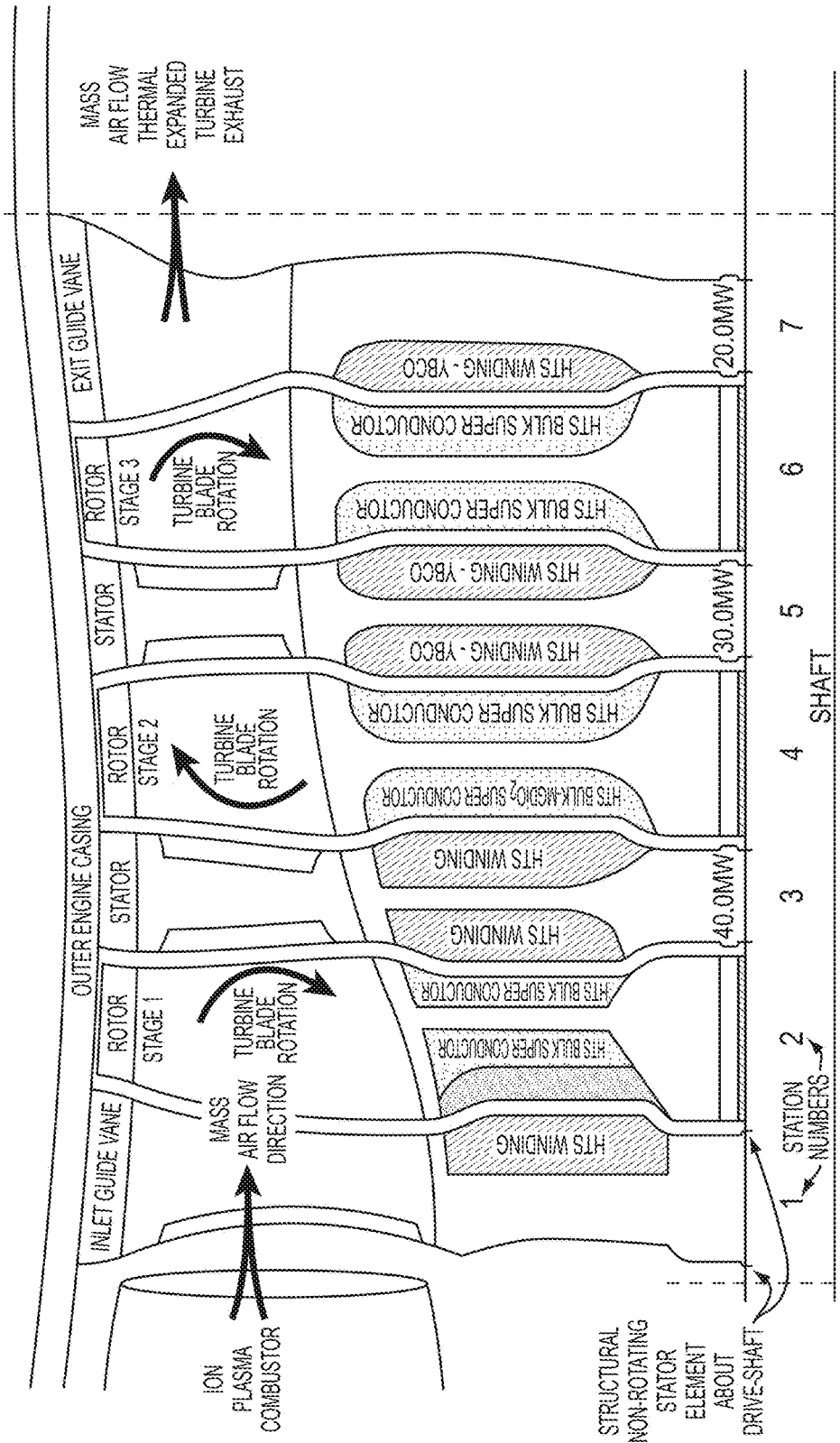
FIG. 3 is a vertical cross section showing a three stage superconducting bulk turbine core.

Referring to FIG. 2, in a first embodiment of the SuperFan invention and its associated 3-Stage turbine core, counter rotating trapped flux field bulk superconducting magnets, as in Gd—Ba—Cu—O single grain bulks, are associated to generate multi-megawatt levels of AC electricity in the generator armatures (Blisk Rotor) and align with Bi2223 wound superconducting coils in the stator. In the Gd—Ba—Cu—O trapped field bulk magnets a cryogen is used for cooling to 50K-65K, creating the cryogenic environment and superconducting condition. Liquid hydrogen is preferred (double utility of the hydrogen cryogen is that it may be also used as fuel to burn in the combustor for combustor with resultant exhaust flow to drive the 3-stage superconducting core). The "hydrogen is pumped through the associated shaft and across a rotating ferromagnetic seal", to be introduced into each one of the three rotating superconducting turbine blisks holding the eight-pole Gd—Ba—Cu—O bulk field magnets. Referring to FIG. 3, the wound Bi2223 HTS electromagnetic plates in an 8-pole configuration are associated with the four stators, aligned axially on either side of each rotating blisk. They are integrated to the outer engine casing, structurally, do not rotate, and pull in the induced power from the synchronous (AC voltage or DC voltage with inverter) movement of the high-speed blisk rotor, with the built in Gd—Ba—Cu—O bulk "puck" superconductors, it passing with small air gap (5.0 mm) between the rotor and the stator. Multi-megawatt power is induced in the embedded cable channels in each stator, and is then moved distally outward to the engine casing, and with a plurality of power electronics and power buses, the power is managed and filtered, and then distributed forward to run the 13-stage, variable-speed, electric superconducting axial compressor and the 3-stage, electric variable speed, fan-diffuser-fan, SuperFan propulsor.

Figure 4:
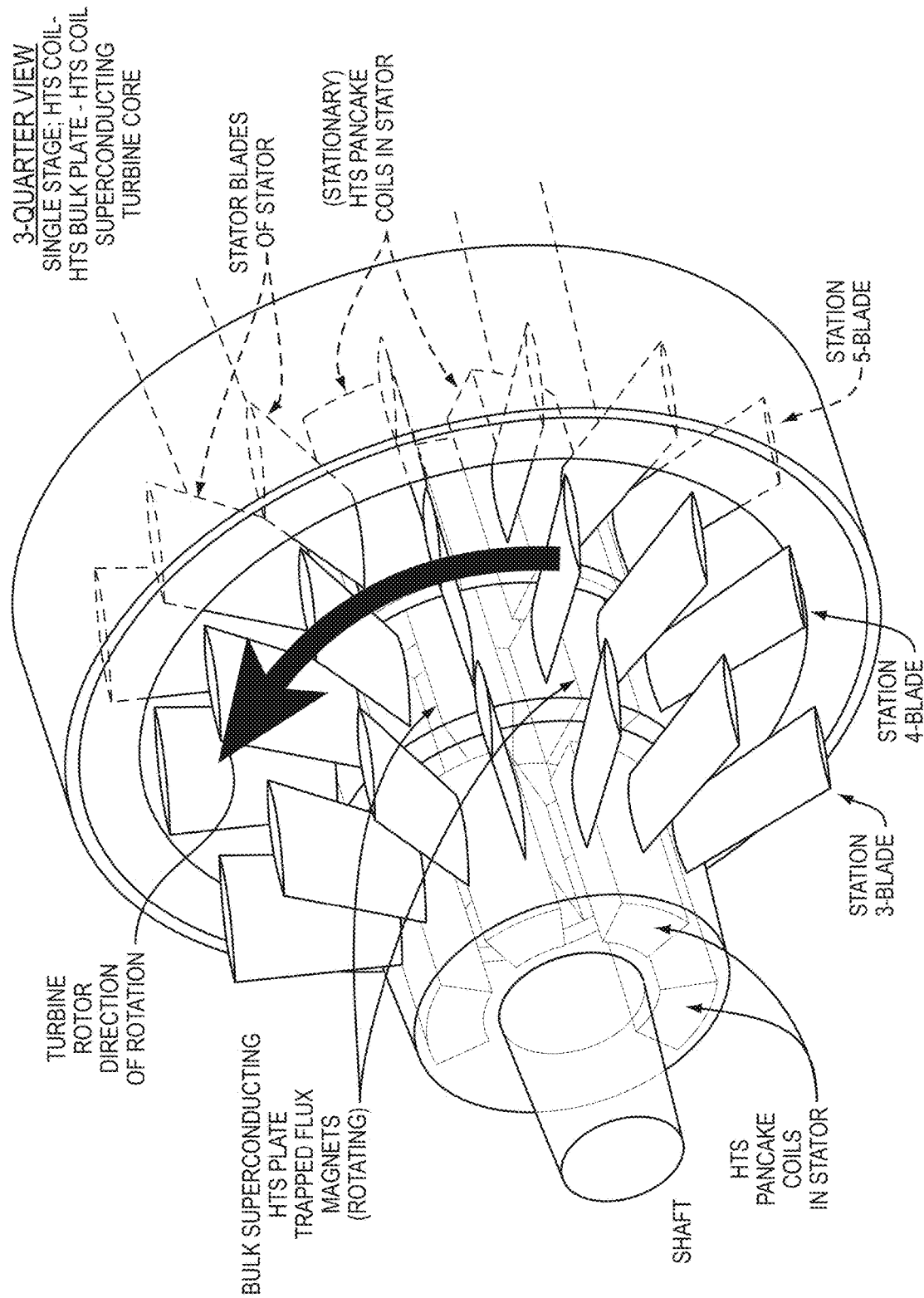
FIG. 4 is a three quarter view single stage HTS coil, HTS bulk plate, and HTS coil superconducting turbine core.

Referring to FIG. 4, this power generation architecture as described here in the SuperFan 3-stage superconducting turbine core of the engine offering a "superconducting bulk trapped field electromagnetics" architecture has not been seen before of what is known in the art and is unique and novel in aerospace propulsion with gas turbines. Trapped field bulk superconducting architectures offer power and torque densities that are as much as 20 times higher than what is observed in synchronous machine HTS field wound power generation architectures. This novel SuperFan power generation turbine core with the novel "superconducting bulk trapped field electromagnets" pose the very high power densities and efficiencies because of the greatly reduced Joule heating. Referring to FIG. 5, current densities in the Bi2223 coils as to be utilized in the stators receiving power from the bulk Gd—Ba—Cu—O superconductors rotating in the turbine rotor blisks will see current densities in the range from 10,000 to 20,000 A/cm2 in the generated magnetic field. These high power densities are of the "trapped field" electromagnetic induction synchronous machine design with injected excitation flux of electric power achieved with a superconducting flux pump at 1.0%-2.0% (FIGS. 8 and 14) of total generated power. This power generation architecture achieves with bulk superconductors in a trapped field architecture magnetic fields of magnitude over 10 to 20 times higher than in the use of conventional magnets without the trapped field flux field generation. Electromagnetic torques in the SuperFan superconducting power generation core, and those applied as in replacing the mechanical shaft are well above what is presently seen and observed in gas turbines of today, these being between 6 Kw/Kg-8 Kw/Kg. These torque metrics are what is observed in the use of mechanical drive shafts to power turbomachinery bypass fans with the commonly known limited mechanical linkage. Bulk superconductors can exhibit JsC of 5×10-4 Amps/cm-2 at 1-Tesla and 77K (boiling point of liquid nitrogen), resulting in trapped fields of 1.5 T-2.0 T. Moving to a Gd—Ba—Cu—O in the bulk superconductor "pucks" of the design and an 8-pole synchronous machine and going to a 77 T operation temperature with hydrogen, in the SuperFan blisks in the rotor, a "trapped field above 3-Tesla" can be achieved. The electromagnetic architecture of the 3-stage superconducting turbine core in SuperFan is so defined to achieve power densities of 40 Kw/kg (approximately 24.6 HP/lb.) to 60 Kw/Kg (approximately 36.9 HP/lb.) at rotational speeds of 8000 rpm to 10,000 rpm with a DC current used to produce a DC magnetic field.

The SuperFan 3-Stage power generation core is an advanced design whose turbomachinery architecture and subsequent superconducting turbine performance has not been noted before and has not been observed in prior art based on references to this field of use in superconducting turbo-electric aero-propulsion. Referring to FIG. 7, to achieve the aforementioned high power densities in the 3-stage superconducting turbine generation core the pole field magnets are wound with Bi-2223 HTS wire in the stators, and are adjacent to, across the designated air gap of 5.0 mm, the "stator-rotor-stator" turbine single-stage machine a Gd—Ba—Cu—O bulk superconducting "puck magnet" 8-pole array" which are assembled in the rotor blisk plates. These rotor plates are observed in FIGS. 3, 5, 6; of which there are three in order (stator-rotor-stator), these blisks are rotated by the high-speed flow from the combustor with hot exhaust impinging and rotating turbine blades of the blisk(s). The intermittent stator stages (stationary) containing the triangular wire Bi-2223 HTS magnets, hold stator turbine blades to straighten the exhaust flow. A liquid cryogen, either nitrogen to operate at a nominal 77K, or hydrogen to operate at 40K-50K is used and passed across a rotating ferromagnetic seal to which a magnetized surfactant is added to the cryogen as it leaves the storage vessel in the engine core and enters the rotating, bulk superconducting Gd—Ba—Cu—O magnets. The SuperFan 3-stage superconducting bulk field design core allows for magnetization of 2.7 T up to 3.5 T field strength in this high-speed, homopolar synchronous machine, bulk superconducting design generating power in AC or DC with magnetic flux pump (FIG. 1), offering a smaller and lighter weight generator machine, and suitable to the required high-speed of gas turbomachinery. Projected weights with cryostats custom designed to the cryogenic environment is called for to target a 110 lb./stage design weight in the SuperFan core. Thus for seven stages (stator-rotor-stator-rotor-stator-rotor-stator) it accounts for a 770 lb. turbine core (without engine casing or power electronics, cryostats or superconducting injection flux pump) producing 90MW or 127,000 shaft horse power delivering 135,000 lb. thrust of SuperFan with a 118 inch diameter triple-counter rotating bypass fan at a 20:1 bypass ratio. Non-conventional topologies in the superconducting machine architectures such as these here in SuperFan are required to meet the power density and torque requirements. Typically, in aerospace propulsion torque demands made of electric superconducting machines can be lower than ground based industrial application because really only the high power is required at take-off, and more nominal power loadings and torque demands are seen at the cruise condition at altitude. The very light weight of the turbine blisk superconducting generator machines and associated topologies in the SuperFan 3-Stage turbine core are designed around the notion of a high force density superconducting generators. Referring to FIG. 8, here more than 3.0 T in magnetic field strength, and a DC current to minimize AC losses, is designed at the magnetic shear gap (approximately 5.0 mm between the rotor and the stators). Flux concentrations and flux trapping is created about the YBCO electromagnetic "puck' bulk round plates (8-pole) in the stators of the turbine core.

Figure 13:
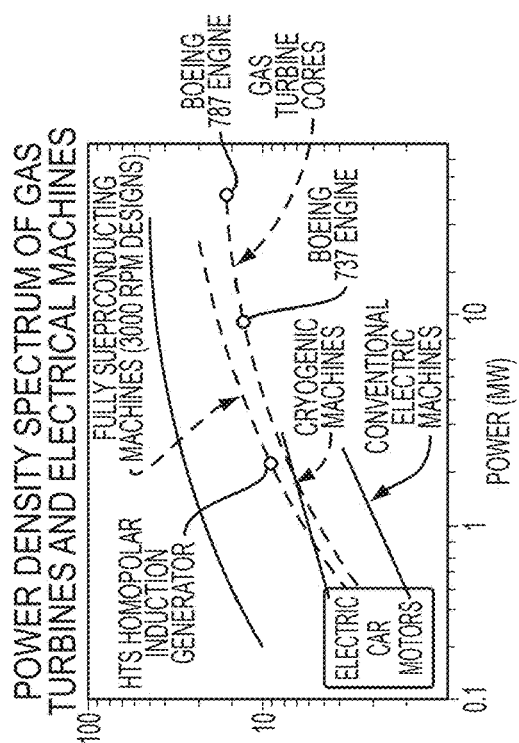
FIG. 13 is a graph showing a power density spectrum of gas turbine and electrical machines.

SuperFan superconducting 3-stage turbine core is three high torque density generation machines which are possible through developing large magnetic fields through the rotor coils in a cryogenic environment HTS wire in the rotor field race track "triangular" coils operating at 20K-30K. Low loss of power density and improved electrical stability, between the rotating bulk field YBCO magnets and the wound Bi2223 wire triangular race track plates occurs with large magnetic fields initially being injected into the coils, and as observed in the design and simulations of the SuperFan design power generation currents are defined in the design of more than 200 amps/sq. cm (FIGS. 10, 11, 13).

Figures 9, 9A:
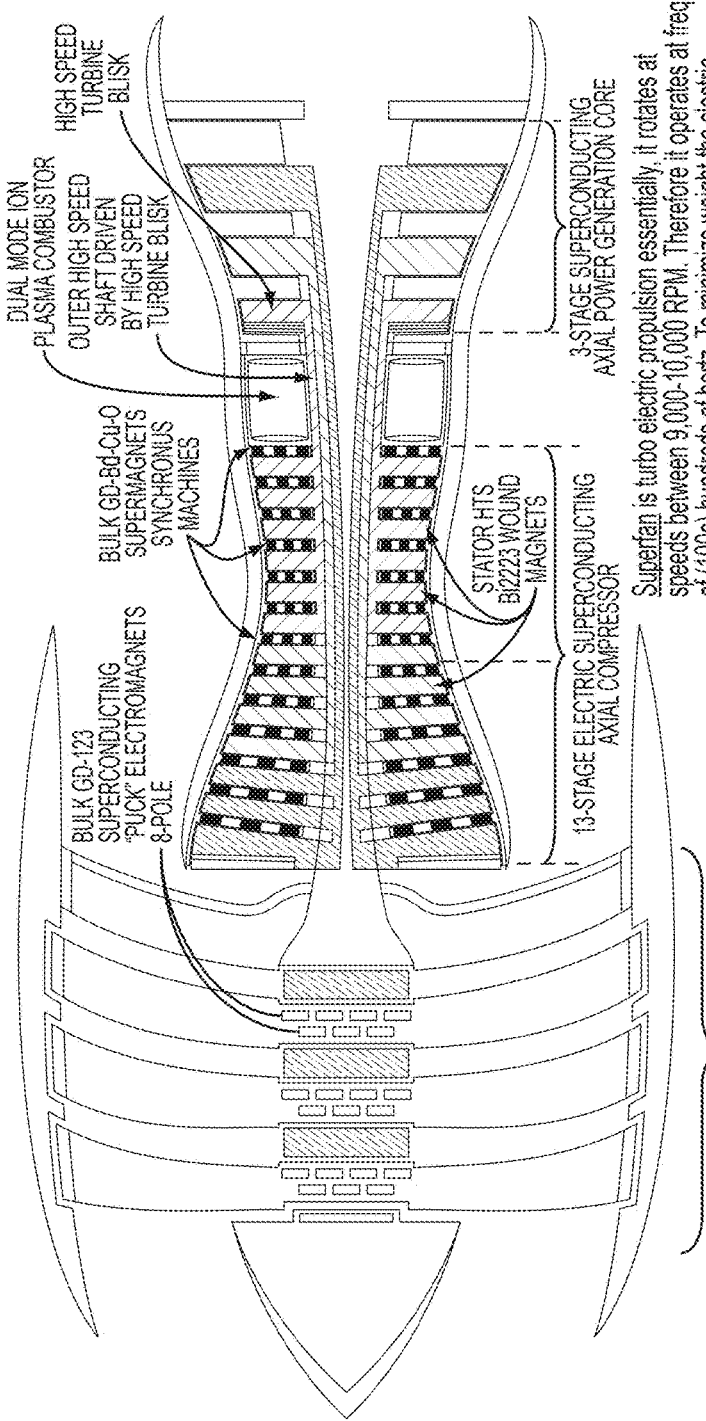
FIGS. 9 and 9A are a view showing electrical segmentation and turbine layout and related equations.
Figure 14:
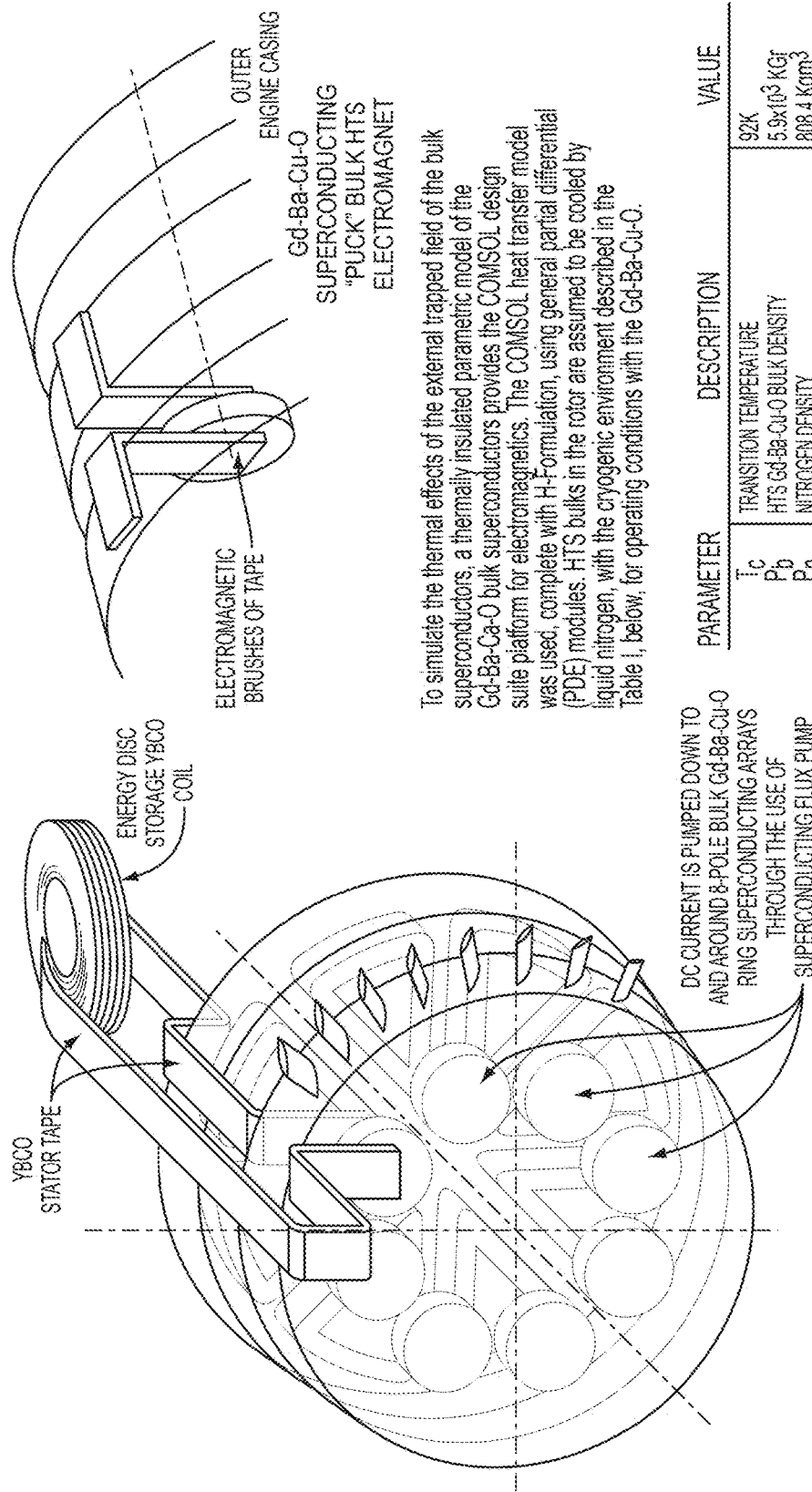
FIG. 14 is a view showing how DC current is pumped down to and around the 8-pole bulk Gd—Ba—Cu—O ring superconducting arrays through the use of a superconducting flux pump.

Large capacity, high density, high-speed superconducting generators require very high torque generation to be effective due to the creation of the large magnetic fields within the rotor coils of this synchronous machine. The SuperFan multistage, axial superconducting power generation core is such a machine in a series of three stages as rotors with the bulk superconducting magnets and the four interstage stators housing wound Bi2223 field electromagnets. HTS rotor bulk field magnets cooled with hydrogen or nitrogen are attractive as the magnetic field strength and power density can be an order of magnitude higher than as observed in conventional machines, and at half the weight and at one third the size. Referring to FIGS. 9 and 10, in order to generate these large fields, and to show HTS fields of the bulk field magnets in the rotor of the SuperFan superconducting power generation core, large currents (often >200 A) must be injected or excited into the bulk field magnets. This requires in each of the three stages of the SuperFan bulk field magnet rotors be penetrated by at least two metal current leads carrying DC current from ambient temperature to cryogenic temperature (FIG. 14). The DC current leads used in this SuperFan power generation core on each one of the rotor blisks containing the bulk field superconducting magnets impose a substantial thermal load upon the cryogenic system, both ohmic heating and thermal conduction heating. This the incurred cooling requirements leads to significant additional thermal loading and cryogenic management. A further design challenge of the axial synchronous rotor turbine blisk superconducting machines in the SuperFan power generating core is the requirement of large DC generated currents across a rotating joint, in order to excite the HTS bulk field magnets. Existing excitation technologies such as slip rings and high frequency brushless exciters all reduce performance and increase complexity of the machine design. Slip-ring contacts suffer from arc erosion at high currents and are unsuited for operation at high speeds above 1000 rpm. Additionally, it reduces the machines power density, reliability, and can cause high maintenance costs.

Figure 12:
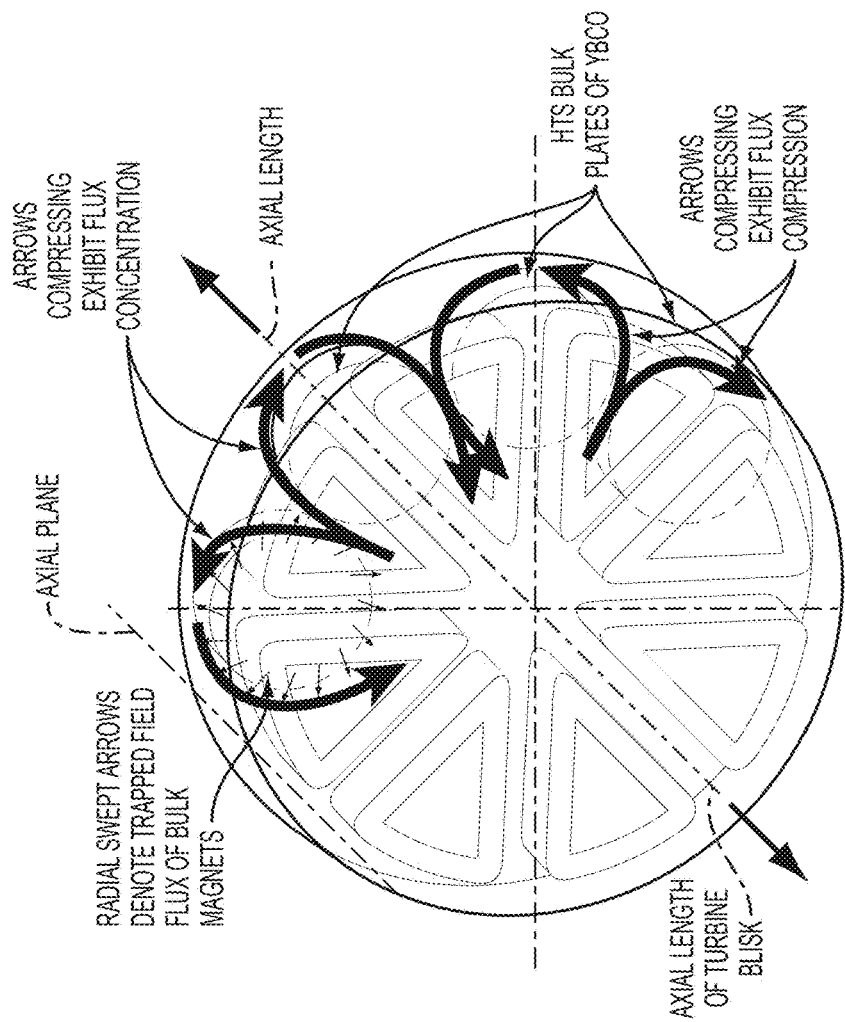
FIG. 12 is a view of the single axial electromagnetic superconducting stage of a 3-stage core.

Referring to FIGS. 11 and 12, a novel and unique approach is used in the SuperFan superconducting turbine core to overcome the challenges of slip-ring DC current injection technology. SuperFan uses a unique design of a superconducting rotating flux pump exciter, where a DC current is injected directly across the cryostat wall, thus enabling the direct excitation of the HTS rotor bulk "puck" 8-pole trapped flux, synchronous rotor array in each turbine rotor machine blisk. across the cryostat wall, in the superconducting turbine core. The superconducting flux pump exciter injects DC electrical current (FIG. 14) and at variable frequency as denoted by the speed RPM of each individual SuperFan blisk in the turbine core. There is a superconducting flux pump injector associated with each turbine stage, thus a count of three. A voltage from an integrated capacitor energy storage bank in the SuperFan outer engine casing which is integrated across the stator delivering electric stages of DC current, a 1.0%-2.0% voltage current through a series-connected circuit "Ro", at a constant open circuit voltage of V-infinity, at a resistance "Rd". In operation the superconducting flux pump exciter with voltage, V-infinity, is observed to be proportional to the frequency of magnet crossings (8-pole bulk Gd—Ba—Cu—O magnets) over the HTS wire (or tape), which acts as the conductor to inject the required voltage at the cryogenic wall of the blisk interface, whilst Rd is attributed to the effect of dynamic resistance due to the oscillating magnetic fields experienced by the HTS 8-pole stator bulk magnets in the blisk.

Turbofan Cycle Analysis: Mechanical Versus Electrical

Figure 15:
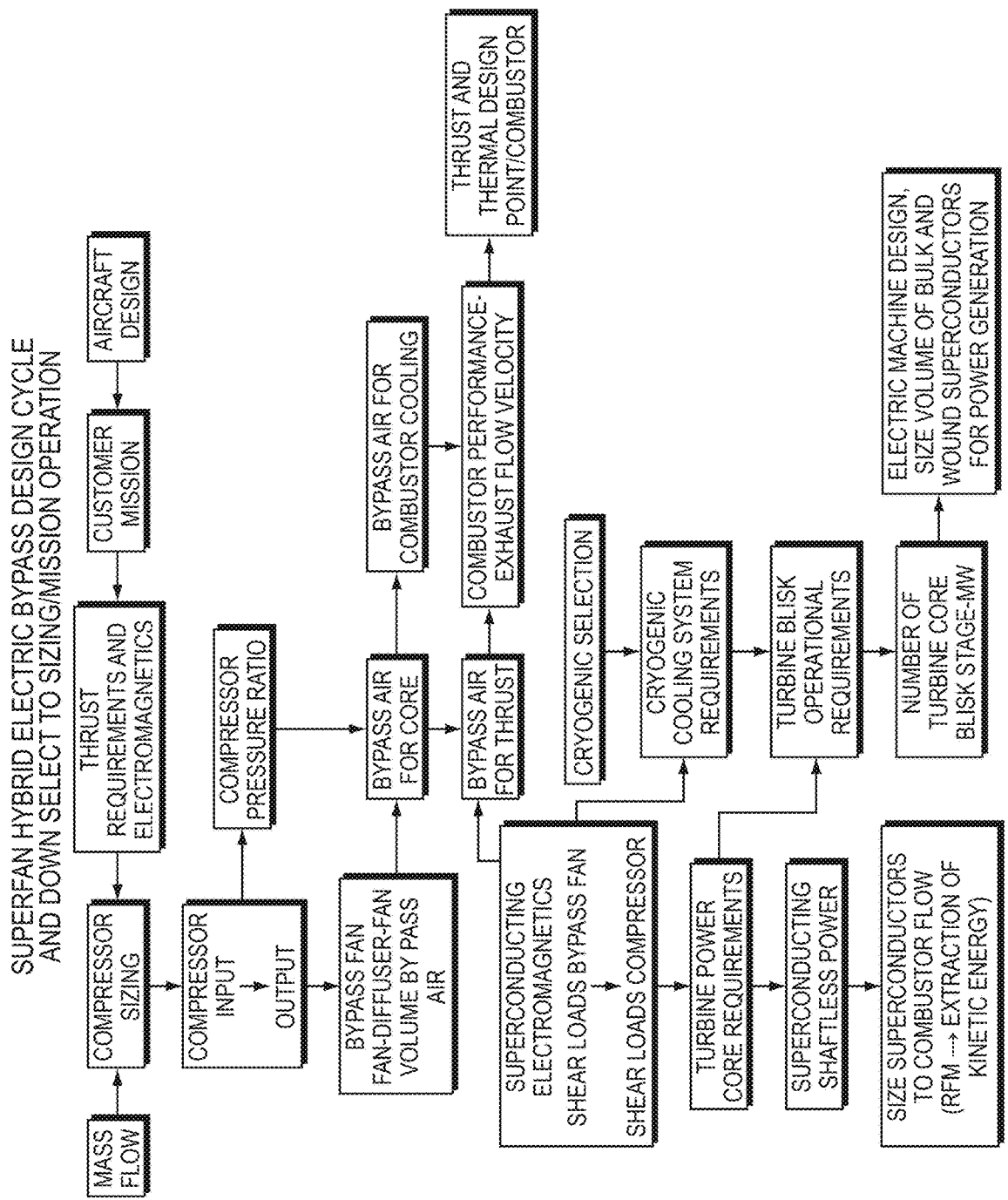
FIG. 15 is a flow diagram showing the electric bypass design cycle and down select to sizing/mission operation.

Referring to FIG. 15, the power balance between the fan Tf, the compressor, Tc and the turbine Tr, is developed through the relationship between total temperature Tt ratios across these components in the following expressions:

$$Tt = 1 - Tr/Ta[Tc-1+@9(Tf-1)]$$

For given values of Tr, Ta and Tc, there is one value of Tf for each value of alpha that satisfies all temperature ratios across these components. This can be further expressed in terms of bypass ratio, @ such that:

$$@ = Taa(Tc-Tf) - Tc - 1$$

$$TrTc(Tf-1)Tf-1$$

An expression of this equation can be derived in integral form (change in temperature and pressure ratio over time, to total change in bypass air and thus fan pressure ratio) to demonstrate a variable fan pressure ratio and bypass ratio for an electric multi-stage turbofan as compared to a mechanically driven turbofan as it relates to temperature, as bypass is inversely proportional to temperature and velocity.

The invention described herein, SuperFan, demonstrates that a multi-disc, turbofan assembly concept, because each fan disc is driven independently by an electric superconducting shaftless core blisk, the fan pressure ratio (hence the mass flow) and the bypass ratio can be varied and optimized against temperature across the main components, fan compressor and turbine. An integral expression of an "electric variable multi-stage ratio bypass fan" with "bypass ratio" in a mixed flow hybrid electric turbofan, as it relates to temperature and pressure, and as turbine temperature moves toward (Delta time) and an optimal temperature ratio of 1.0, divided by the fan temperature as it moves toward the compressor-turbine temperature ratio, the power balance of the turbine and the compressor total temperature is removed from the total endothermic/enthalpic power balance of the turbine, remaining and leaving the bypass thermic reaction of mixer gasses and variation of pressure across the fan independent and highly efficient (fan pressure ratio of change in Delta P).

Superfan Electromagnetic Combustor

Figure 16:
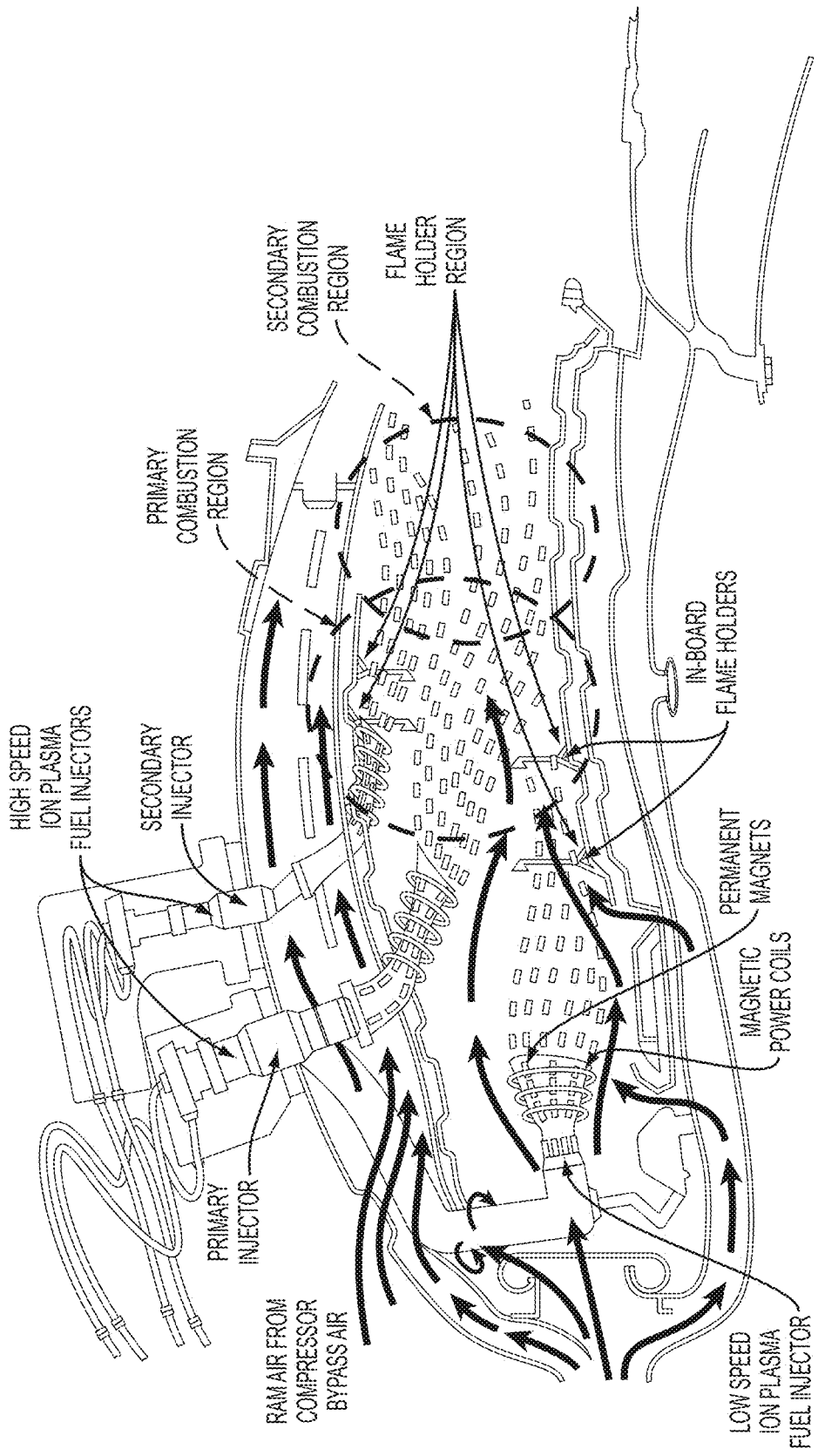
FIG. 16 is a view showing the ion plasma can annular combustor.
Figure 17:
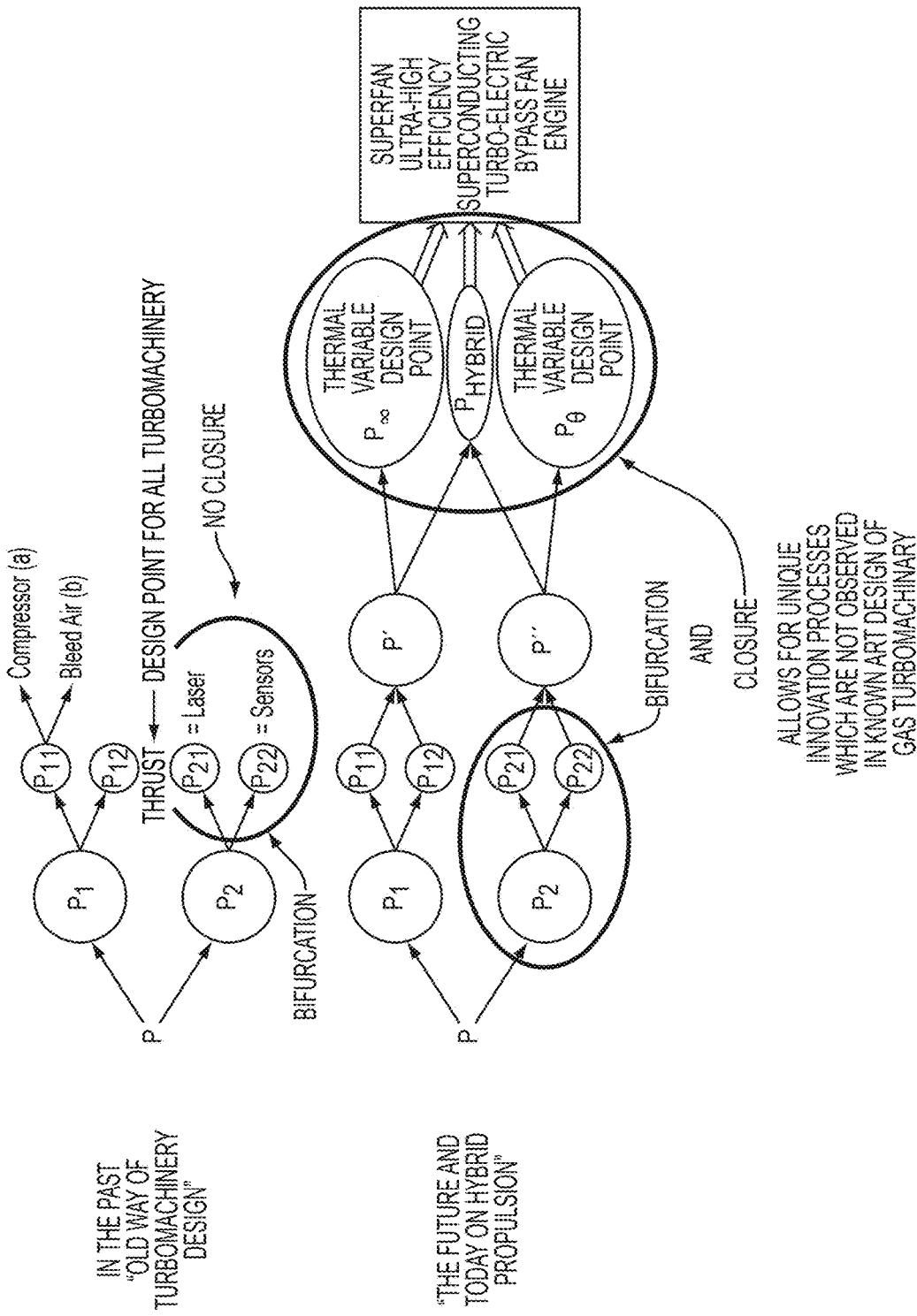
FIG. 17 is a vector flow design and innovation diagram.

Referring to FIG. 16, SuperFan has an electromagnetic combustor so designed to improve thrust and efficiency and to remove almost all greenhouse gas emissions by the application of a significantly large external electromagnetic field to a mixture of atomized air, molecularized with fuel to s specific predetermined density, in an annular turbine combustor configuration, where by a can-annular design predominates in a circumferential geometry about at central hollowcore and the rotating 3-spool shafts.

An electric current from the superconducting turbine power core of SuperFan is distributed into the atomized air by a plurality of ion plasma fuel injectors of which at least two injectors, a high speed and a low speed injector (FIG. 16) make up the fuel combustion injection process of one of the each twelve can-annular combustor chambers, thus to affect the propagation speed, stability, flame size and shape of combustion chemistry of the fuel air mixture at the flame front. One aspect of the disclosed SuperFan electromagnetic combustor is the illustration of a single can-annular combustor in side-view, with a flame holder, flame holder region, combustion region and a high speed, and low speed electromagnetic fuel injector(s) with electric arc generation coils and permanent magnet fuel distribution coils (FIG. 16), so designed for combustion efficiency and includes a novel radial magnetic soaring arc flame stabilizer (RMSAFS) to stabilize the flame front and its progression across the combustor. No physical cavities or apertures to capture combustion products to improve residence time and stabilize flame intensities and position as are seen in current art. None are observed in the SuperFan Ion Plasma Combustor, thus making this component of the invention in the SuperFan gas turbine unique in its process to stabilize the flame front during circulation of combustion products in the can annular architecture extracting the kinetic energy from the fuel into high speed flow in cycling to thermal energy and a positive delta on thrust. This configuration also addresses combustion noise, reducing it as the flame front is protected from temperatures surges and instabilities which the magnetic arc field controls, which is the driver for acoustic stability and can be suppressed to as low levels as 65 dB while the NOx emission can be kept in the single digit range according to SuperFan engineering data (6.0-9.0 PPM) with 1300.0 Degree C. combustor exit temperatures at atmospheric conditions.

Figure 18:
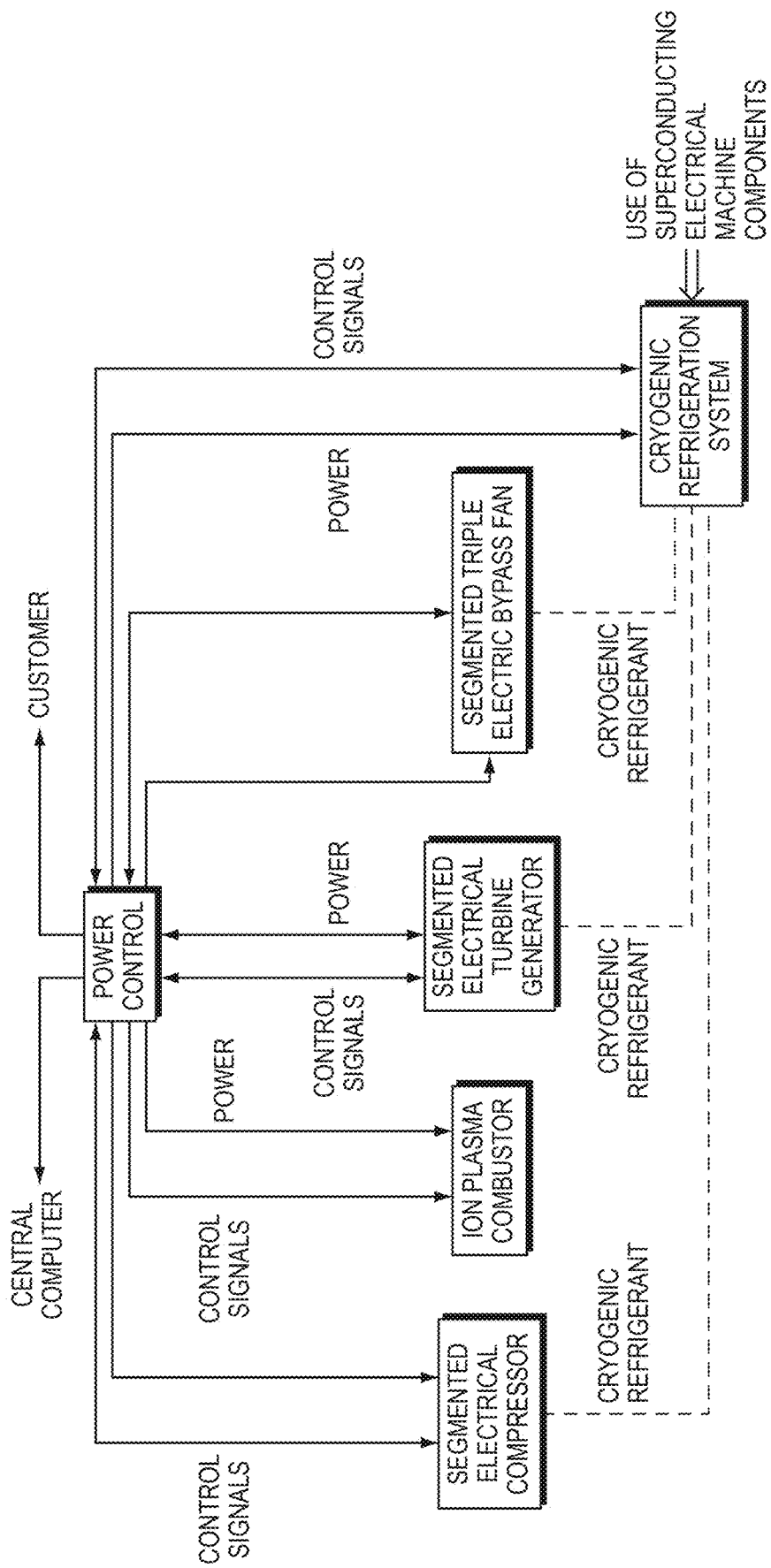
FIG. 18 is an electric non-Brayton cycle schematic.
Figure 19:
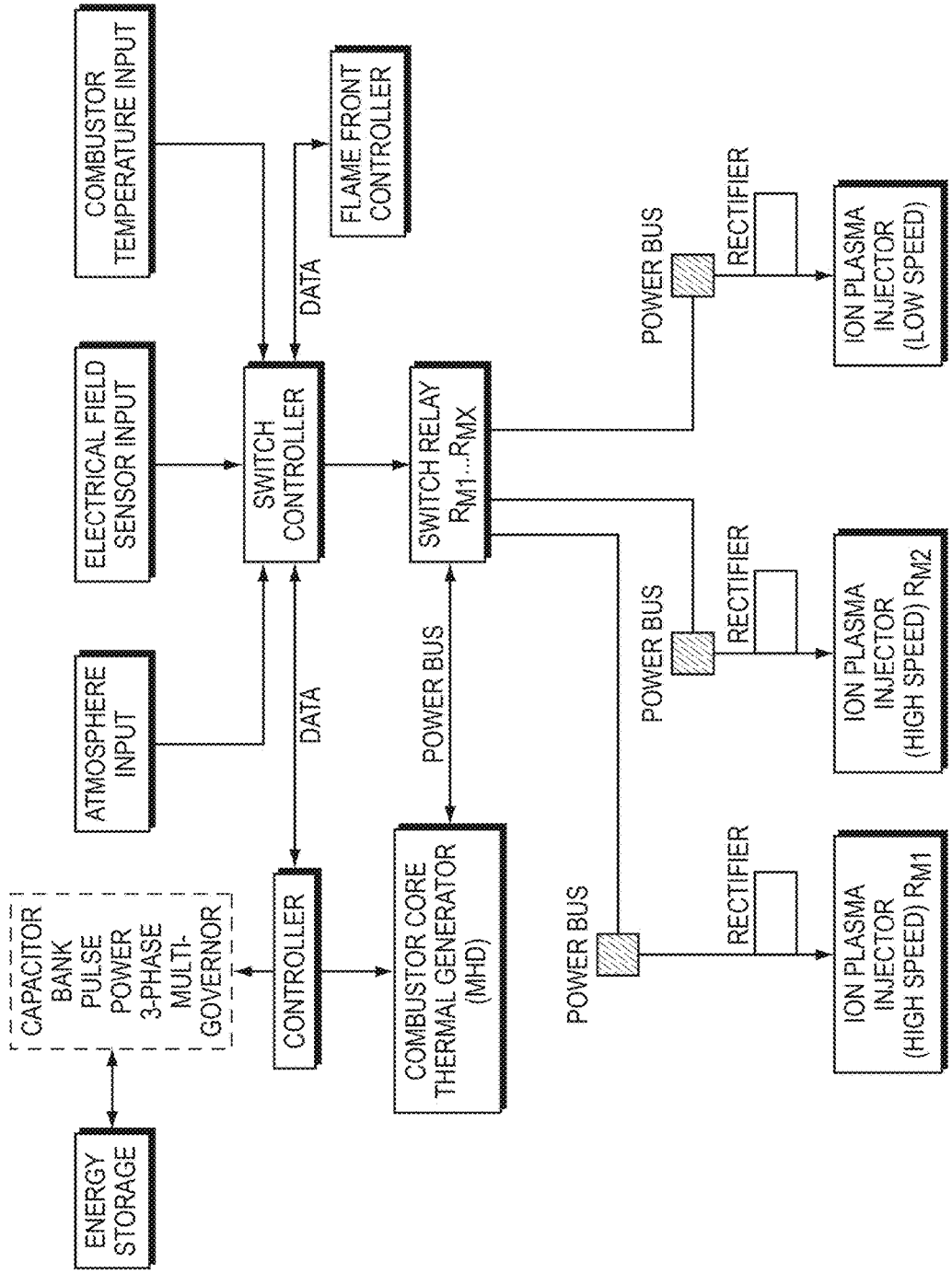
FIG. 19 is a flow diagram showing the ion plasma combustor control system.

Referring to FIG. 19, according to the disclosed technology here of plasma injector combustion, a plasma discharge is created by applying a direct (DC) electric field between two electrodes. The Magnetic Ion Plasma Annular Injection Combustor (MIPAIC) receives power from DC electricity from the 3-stage superconducting turbine core of SuperFan, which is set behind the combustor, receiving its flow to operate and rotate. The electric load is directly deposited to the ion plasma injection electrodes. A power bus controls and maintains the electric load within specific limits to control the discharge and plasma intensity so as to maintain an average electron temperature (Te) and average gas temperature Tg, where gas temperature from combustion is roughly 2800 F. Air exits in between the electrode pairs in a circular arc ring which follows the circumference of the interior curvature of the outer casing of the combustion annular can of which there are twelve units, and lie inside of the combustor liner that is adjacent to the cylindrical geometry of the engine casing. Referring to FIG. 18, there is shown the layout and schematic of the electric architecture of the ion plasma power control system, which comprises of a plurality of sensors, coupled to a switch controller. The energy source comes from the superconducting turbine core which is coupled through a capacitor bank in the power management architecture, along with pulse power and a three phase governor, and to a controller, and a combustor core thermal generator. A switch relay case which runs off the switch controller an in series through the power bus provides electrical power to the respective plasma injection electrodes. Control maybe programmed to control the switch controller and provide optimal plasma injection and combustion performance.

Positioning is set whereby the location of the injectors is more closely aligned with the upstream end of each combustor annular can where the inlet velocity is highest from the combustion gases. Thus the placement of the ion plasma injectors is set so that the highest degree of plasma atmospheric saturation can occur of the fuel and the magnetic field enhances to the highest level of charge density, and thus highest atmospheric charge density ratio of the fuel within the magnetic field, and enhancing to the highest parts per million count of fuel to density ratio of the incoming air (oxidizer), and as determined by the pressure differential from the upstream compressor and diffuser air, and the temperature gradient across the combustor can, from the downstream lower pressure and diffused combustor air. This is done so that the perimeter of diffused combustor air, and its velocity, is slowed by the last several diffuser vane stages in front of the combustor, and the cylindrical arrangement of annular combustor cans, and the higher velocity compressed air, interacts with the higher density molecularized fuel that is dispersed as it is coming from the higher density arrangement of the electrically charged ion plasma injectors. At the square area of the surfaces at the interior perimeter of first the annular combustor cans, compared to the lower density placement per square area of the ion fuel injectors at the back of the can annulus, the flow is dispersed evenly but accelerated (closed end) by the plasma discharges of the plasma injectors and the magnetic fields on the control of flame front and flame intensity which is a component of required residence time and creation of lean electric ion plasma fuel combustion.

For the magnetic ion plasma combustor process to begin, heated airflow from the SuperFan compressor impinges upon the closed end of the annular combustor, which sits in a circumferential geometry around the interior of the combustor liner (FIG. 16.). The diameter of the combustor liner closely matches the diameter of the last stage of the last compressor stage at approximately 42.0 inches. The circumferential arrangement of the annular combustor and its geometry is set so the predominant mixing area between the molecularized fuel and the compressor inlet air flow is slightly smaller in diameter, where the height of the annulus of the combustor is a maximum of approximately 10.0". Bypass air from the triple-fan of SuperFan provides additional thrust and cools the interior of the combustor. The annular combustor is structurally supported by the interior and exterior combustor liners and at their circumference, of the end plate for the combustor chamber. The annular combustor has a series of holes circumferentially at the closed end, with also a series of stream tubes with slots in them which allows heated compressed air into the annulus of the combustor where the ion plasma injector arrays are located. The annular ion plasma combustor of SuperFan has a plurality of ion plasma injectors, both high-speed and low-speed, joined by an ignition assembly and adjoining fuel pumps, spaced circumferentially around the combustor, evenly spaced about the combustor zones. There are twelve combustor zones about the combustor, radially. Each combustion region has a flame holder sector, or region, and this sector is so designed for combustor efficiency and placement of the flame front as molecular density of mixing fuel and air increases with expansion and movement aft from the front of the annular combustor to the back of the combustor. The combustor efficiency design which is observed by the placement and the distribution of each high-speed and low-speed plasma injector also includes a novel, radial magnetic soaring arc flame stabilizer (RMSAFS) to stabilize the flame front and its progression across the combustor (FIG. 16). No physical activities or cavities or apertures are used to stabilize the flame front during circulation of the fuel and its atomization, as is known in the current art. This makes such features in the combustor novel and unique in the SuperFan ion plasma combustor design. This configuration also addresses combustion noise, reducing it as the flame front is protected by temperature surges and instabilities which the magnetic arc field controls, which is the driver for acoustic stability and can be suppressed to as low a level as 80 dB while the NOx emission can be kept in the single digit level (6.0-9.0 PPM) with 1300 degree C., combustor exit temperature at atmospheric condition.

Hybrid-Electric Aero-Propulsion Versus all-Electric Aero-Propulsion.

The energy density of jet fuel is 43.0 MJ/Kg, while Lithium Ion Polymer batteries achieve not even 1.0 MJ/Kg of energy density. It is hard pressed to think that all electric propulsion has any chance at all in flying passengers at 250 seats per airliner across the country, not alone a short hop from LA to San Francisco. But it amazing how many young companies are trying this when the energy and scientific facts are stacked against them, the physics and math are not just there.

Figure 20A:
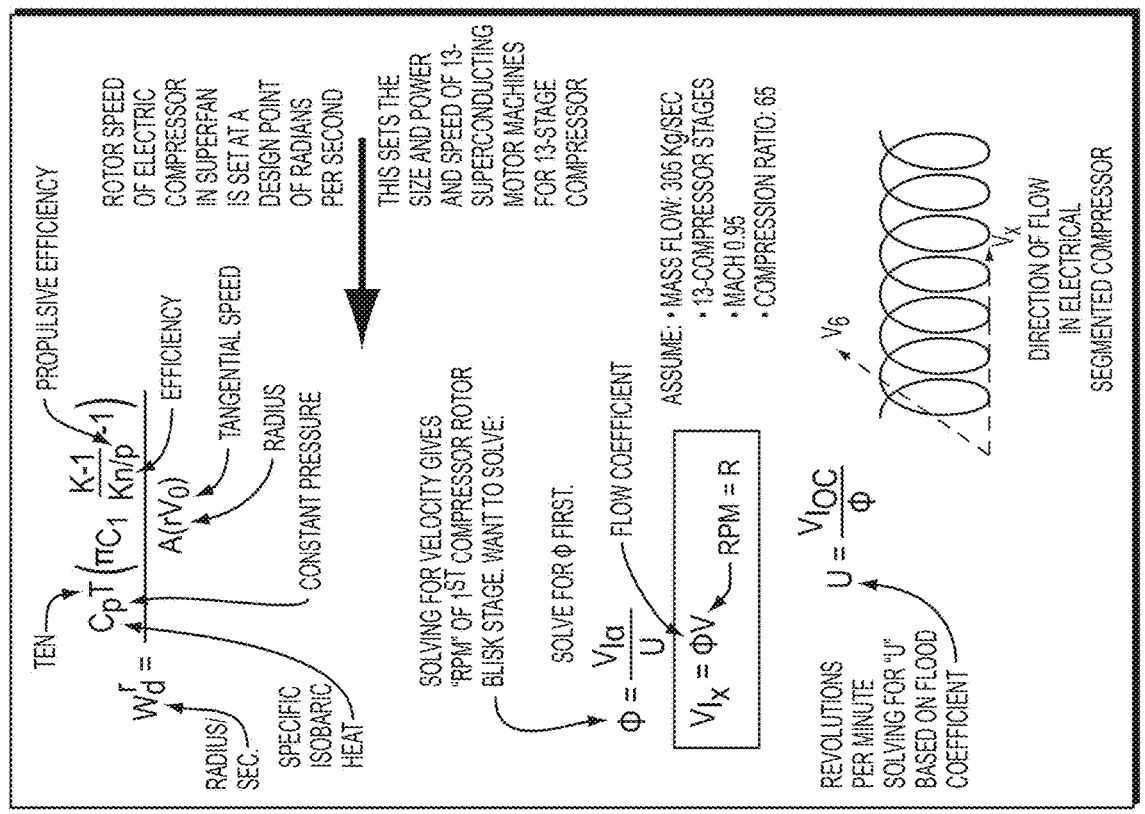
FIGS. 20 and 20A are respectively graphs and equations showing and predicting engine compressor performance.
Figure 20:
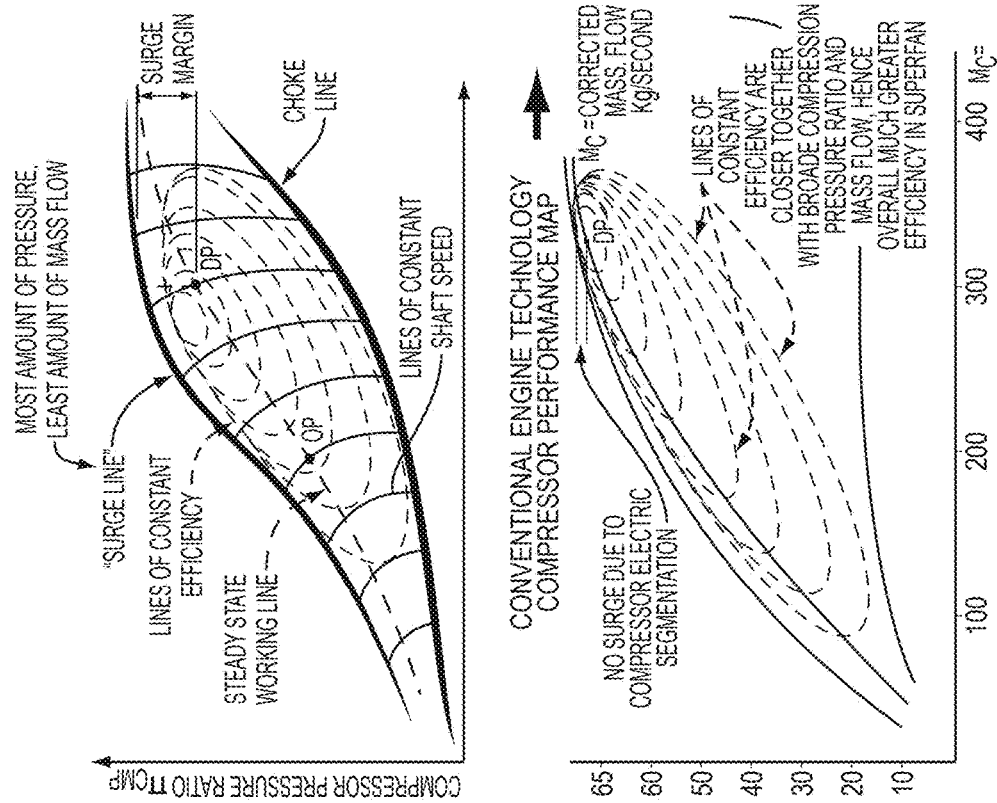
Figure 21:
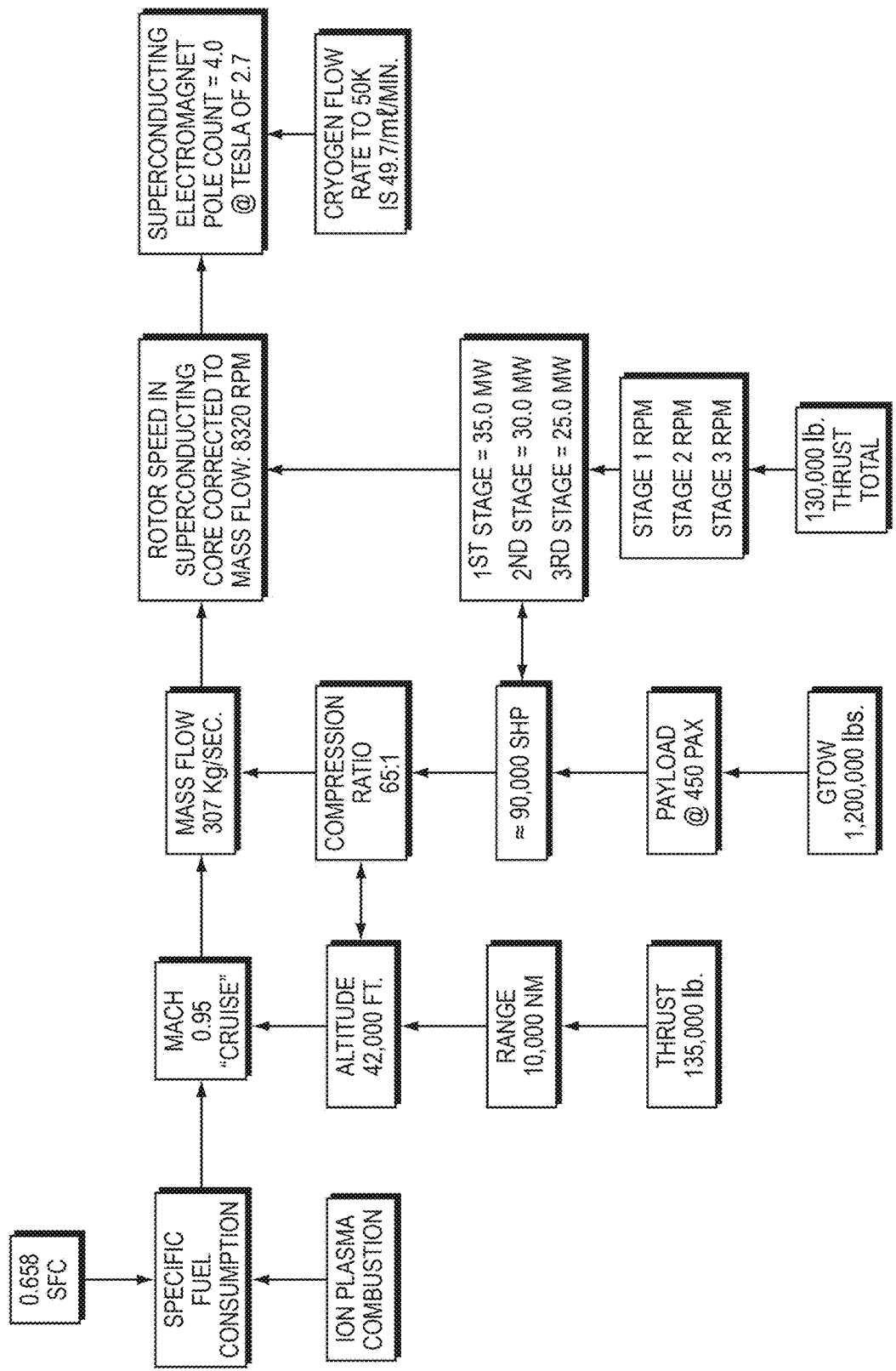
FIG. 21 shows flow chart metrics of performance.

Referring to FIGS. 20-21, energy density is only half of the problem when it comes to the reality of development of electric propulsion for flight, versus a hybrid electric propulsion system as can be examined in a flow chart of engine metric efficiency. In looking at a medium range aircraft, let's base the engine propulsion system on the CCFM56 turbofan engine. These engines produce between 100 kN to 150 kN of thrust. In cruise their thrust is considerably lower due to the low density in cruise altitude and due to them moving at Mach 0.85. We use a value of 25 kN—this is enough so that two engines (one under each wing) will comfortably push an A320 class passenger aircraft (think JetBlue, they fly the largest fleet of A320's globally) through thin air at altitude.

The power to produce such an amount of thrust is force times speed. The speed when flying at Mach 0.85 at 35,000 ft. is 240 m/s, so the power produced by one engine is 6.0 MW. Now if one examines how big and heavy an electric motor is to be to produce 6.0 MW continuously, it is considerable. Big industrial motors come in at 1 kW/Kg, so the electric motor to support this flight condition is 6 tons. This is three times the weight of a CFM56-2 at 4,298 lb. The electric motor in this case here still has no casing, no fan, no power management electronics and no energy source (lithium batteries or hydrogen fuel cells are the current choice). The smaller electric motors for aircraft are pushing 10 kW/Kg, which is the power to weight ratio of the GE90 turbofan, but when the small electric motors are scaled up to size will lose half that power to weight ratio, so 5 kW/Kg. Also, even at 98% efficiency the motor will generate 120 kW of heat—this needs to be removed, and operating in thin air makes this challenging.

With current technology of today the motor could achieve maybe 2 or 3 kW/Kg—this means the motor driving our hypothetical engine comes in at 2 to 3 tons. Add to this the fan, the engine casing, the power management electronics (but will not need the high pressure components of the turbomachinery), but double the fan weight because it is needed to be compensated for the high energy core flow, which is missing. This is 50% of the weight of the CFM56-2, so 1.2 tons of additional weight is added.

This hypothetical aircraft propulsion motor will be twice as heavy as the parts it replaces. There is considerable work needing to be done, even with the influx of synchronous AC superconducting motor machines, before all electric propulsion has any advantage to power a 200 passenger airliner. Then there is the notion of range, and the challenges of an energy source to power twin electric fan motors in the A320 Airbus example here across 2000 nautical miles, wheels up to touch down. Electric propulsion does offer the advantage of not dumping half of the energy supplied to it (jet fuel) overboard in a hot, fast moving, noisy gas stream.

Figure 22:
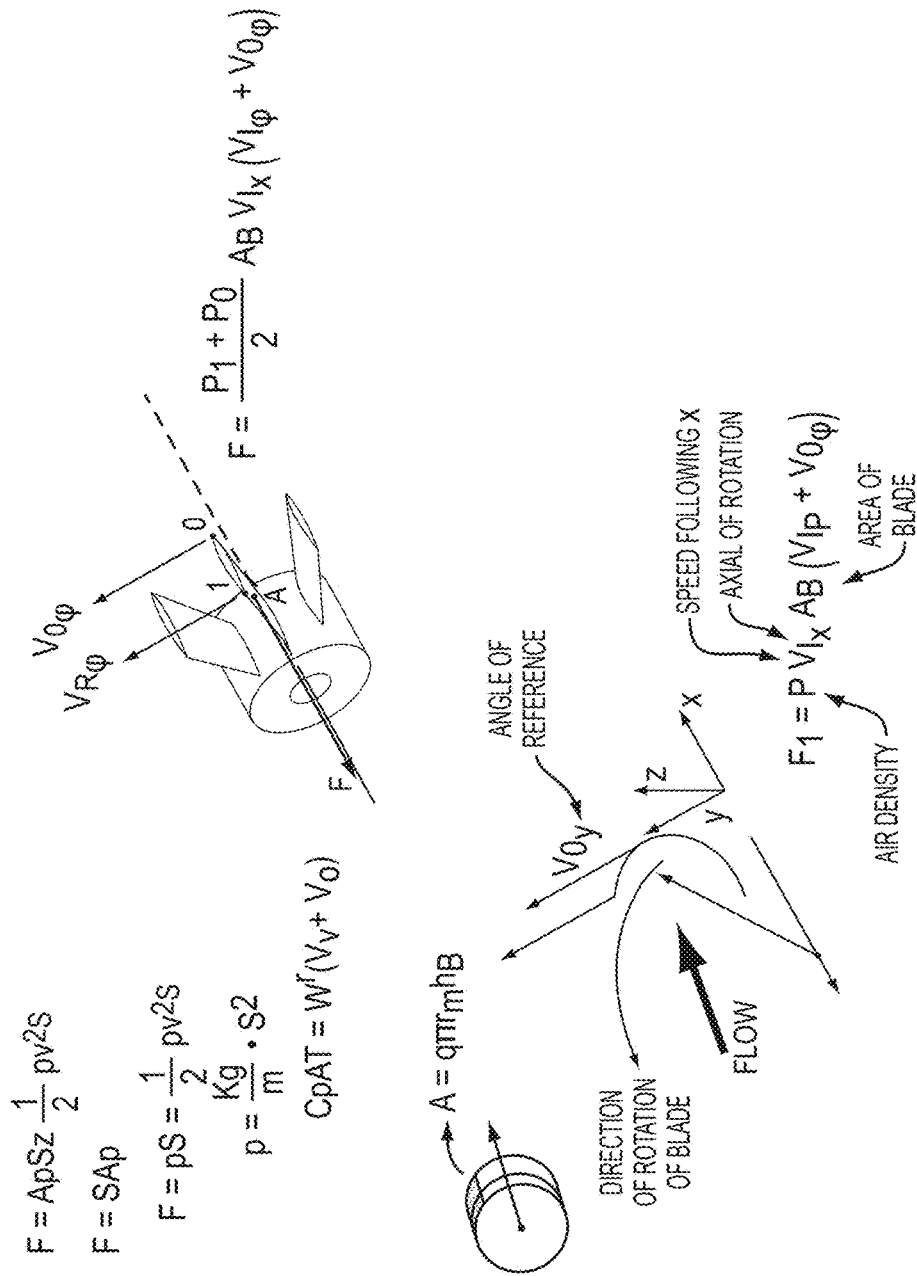
FIG. 22 shows first stage compressor performance analysis.

Referring to FIGS. 22 and 23 and concluding, hybrid electric turbofan propulsion as discussed here with SuperFan provides the ultimate solution to "going green" in the future of global commercial air transport. SuperFan offers many benefits including dramatic efficiency gains in fuel burn reduction and compressor efficiency via the shaftless electric architecture from onboard power to reduce greenhouse gas emissions with on board engine power to reduce greenhouse gas emissions by close to 95%; by powering the plasma injection combustor with the hollow shaftless superconducting power core providing variable electric speed fans, compressor and turbine 100% thermal and aerodynamic matching; and in achieving considerable noise reductions as the acoustic map of the hybrid electric turbofan blading is held in magnetic levitation with both root and tips of all blade and fan structures captured, vibration becomes non-existent.

On power source energy density, jet fuel is about 43 MJ/Kg, while Lithium polymer batteries achieve not even 1.0 MJ/Kg! In a future commercial electric aircraft motor for flight the electric current will be produced by either a high efficiency turbine-generator combination, or by fuel cells, burning hydrogen at twice the efficiency of a conventional jet engine. Hydrogen packs 142 MJ per Kilogram, at twice the efficiency the electric airliner would only need 162 Kg of hydrogen for every ton of jet fuel in a conventional jet. However, despite its amazingly high energy density content, hydrogen takes up three times the volume of other carbon fuels, so to fly, the A320 airliner scenario would make the airliner three times its size.

On Lithium batteries for all electric flight, the fact that empty batteries weigh as much as full ones is the final nail in the coffin of battery powered flight, cutting duration and range drastically. While your average long range jet lands at 60% of its take-off weight, the battery powered jet would have to carry those heavy batteries all the way to the final destination. To be competitive in this aircraft operation scenario with a US cross country range airliner, these hypothetical Lithium batteries would have to have twice the energy density of kerosene. With energy density, jet fuel has 34 MJ/Kg, whereas batteries having up to 0.36 MJ/Kg, so there would need to be more than 100 times more space on board to store the same amount of energy.

Additionally, even if Lithium ion battery technology advances dramatically over the next ten years to where it has equal energy density to jet fuel and is also stable (major safety concerns in aviation), the aircraft will need to carry the entire mass of the batteries for the entire duration of the flight. Thus as the flight goes on, far more energy will be used per mile on a battery powered flight than on a fuel-powered one, even if the batteries have the same energy density of the fuel. This also means that even more battery mass will be needed for the same range, since that extra energy requirement has come from the batteries.

The following prior art references may assist one of ordinary skill in the art in the practice of this invention.

"Aircraft Engine Emissions, Environmental (EMV) Unit". International Civil Aviation Organization. Jan. 6, 2011. http//:www.icao.int/icao/en/env/aee.htm "The Implementation of Powered Gearboxes into Turbofans to Improve Engine Efficiency". AIAA 2014 Propulsion and Power Symposium, Session A8, Paper #144

"Development in Geared Turbofan AeroEngine", IOP Science. Nov. 1, 2016. http://iopscience.iop.org/article.10.1088/1757-899X/131/1/012019/pdf "Flying's New Gear". The Economist. Jan. 2, 2016 http://www.economist.com/news/science-and-technology/21684775-quieter-more-economical-jet-engine-fitted-gearbox "Aircraft Engine Emissions. Environmental (EMV) Unit". International Civil Aviation Organization. Jan. 6, 2011. http//:www.icao.int/icao/en/env/aee.htm "Liebherr-Aerospace and Rolls Royce create power gearbox joint venture". Liebherr. Jun. 11, 2015. http//:www.liebherr.com/en/usa/latest-news/news-press-releases/detail/liebherr-aerospace-and-Rolls-Royce-create-power-gearbox-joint-venture.html "High Power Superconducting Electric Motors". 2007 Annual Review; NASA GRC. Dr. Philippe Masson, (UAPT PI), Jules Pienkos, PhD.

"High Specific Power HTS Electric Machines". Konstantine Kovalev, et al., pe.org.pl/articles/2017/11/27.

Z. Sheng, J. Tang, S. Cheng and Z. Hu. "Modal Analysis of Double Helical Planetary Gears with Numerical and Analytical Approach". The American Society of Mechanical Engineers. Aug. 4, 2014

G. Norris. "Rolls Royce Details Advance and UltraFan Test Plan". Aviation Week. Aug. 25, 2014.

"Rolls Royce runs worlds most powerful aerospace gear box for the first time". Rolls Royce. Jan. 8, 2016. http://www.rolls-royce.com/media/press-releases/press-releases/yr-2016/pr-24-10-2016-rr-runs-worlds-most-powerful-aerospace-gearbox-for-the-first-time.aspx.

U.S. Pat. No. 8,365,510
U.S. Pat. No. 8,446,060
U.S. Pat. No. 8,720,205

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

What is claimed is:

1. A gas turbine engine comprising:
an outer casing;
a central longitudinal hollow shaft with a forward air inlet;
a three stage rotating bypass fan with front and rear fan blades and a diffuser blade interposed between said front and rear fan blades;
a variable speed multiple stage axial compressor positioned aft of the three stage rotating bypass fan; and
a multiple stage turbine core positioned aft of the multiple stage variable speed axial compressor,
wherein the front fan blades, the diffuser fan blade, and the rear fan blades are incorporated respectively into a first blade and disc combination, a second blade and disc combination, and a third blade and disc combination, each positioned radially outwardly from the longitudinal hollow shaft and said blade and disc combinations respectively have first, second, and third integral rotor electromagnetic coils.

2. The gas turbine engine of claim 1 wherein first, second, and third stator coils are fixed to the outer casing in proximate opposed relation respectively to the first, second, and third integral rotor electromagnetic coils.

3. The gas turbine engine of claim 2 wherein an exhaust flow is established which generates electric power in a three stage turbine core and powers the bypass fan and does so by inducing an electrical current into the fixed first, second, and third stator coils which drives the fan blades to push and compress air.

4. The gas turbine engine of claim 3 wherein the stator coils are cryogenic copper field coils.

5. The gas turbine engine of claim 4 wherein there are stator channels between the stators coils and the outer casing and cables in the outer casing and electrical power flows from the stator coils to the multiple stage axial compressor.

6. The gas turbine engine of claim 1 wherein a high speed plasma injector connects the multiple stage axial compressor with the ion plasma combustor and a low speed plasma injector connects the multiple stage axial compressor with the ion plasma combustor.

7. The gas turbine engine of claim 1 wherein the multiple stage turbine core includes an inlet guide vane and an outlet guide vane.

8. A gas turbine engine comprising:
an outer casing;
a central longitudinal hollow shaft with a forward air inlet;
a three stage rotating bypass fan with front and rear fan blades and a diffuser blade interposed between said front and rear fan blades;
a variable speed multiple stage axial compressor positioned aft of the three stage rotating bypass fan; a multiple stage turbine core positioned aft of the multiple stage variable speed axial compressor,
wherein the front fan blades, the diffuser fan blade, and the rear fan blades are incorporated respectively into a first blade and disc combination, a second blade and disc combination, and a third blade and disc combination, each positioned radially outwardly from the longitudinal hollow shaft and said blade and disc combinations respectively have first, second, and third integral rotor electromagnetic coils, and the first, second, and third cryogenic copper field stator coils are fixed to the outer casing in proximate opposed relation respectively to the first, second, and third integral rotor electromagnetic coils, and an exhaust flow is established by the combustor impinging on the three stage turbine rotor blades generating electricity in the core and rotates the bypass fan adding kinetic energy to the mass air flow as bypass air and is driven by an electrical current in the fixed first, second, and third stator coils.

9. The gas turbine engine of claim 8 wherein there are stator channels between the stator coils and the outer casing and cables in the outer casing and electrical power flows from the stator coils to the multiple stage axial compressor.

* * * * *